United States Patent
Bond

(10) Patent No.: US 9,996,595 B2
(45) Date of Patent: Jun. 12, 2018

(54) PROVIDING FULL DATA PROVENANCE VISUALIZATION FOR VERSIONED DATASETS

(71) Applicant: Palantir Technologies, Inc., Palo Alto, CA (US)

(72) Inventor: Ethan Bond, Troy, NY (US)

(73) Assignee: Palantir Technologies, Inc., Palo Alto, CA (US)

( * ) Notice: Subject to any disclaimer, the term of this patent is extended or adjusted under 35 U.S.C. 154(b) by 373 days.

(21) Appl. No.: 14/816,264

(22) Filed: Aug. 3, 2015

(65) Prior Publication Data
US 2017/0039253 A1    Feb. 9, 2017

(51) Int. Cl.
*G06F 7/00*     (2006.01)
*G06F 17/30*    (2006.01)

(52) U.S. Cl.
CPC .. *G06F 17/30554* (2013.01); *G06F 17/30309* (2013.01); *G06F 17/30548* (2013.01); *G06F 17/30958* (2013.01)

(58) Field of Classification Search
CPC ......... G06F 17/30554; G06F 17/30958; G06F 17/30309; G06F 17/30548
USPC ................ 707/722, 797, 798, 799, 634, 728
See application file for complete search history.

(56) References Cited

U.S. PATENT DOCUMENTS

| | | | |
|---|---|---|---|
| 5,109,399 A | 4/1992 | Thompson | |
| 5,329,108 A | 7/1994 | Lamoure | |
| 5,632,009 A | 5/1997 | Rao et al. | |
| 5,632,987 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |

(Continued)

FOREIGN PATENT DOCUMENTS

| | | |
|---|---|---|
| AU | 2014206155 | 12/2015 |
| AU | 2014250678 | 2/2016 |

(Continued)

OTHER PUBLICATIONS

Glaab et al., "EnrichNet: Network-Based Gene Set Enrichment Analysis," Bioinformatics 28.18 (2012): pp. i451-i457.

(Continued)

*Primary Examiner* — Md I Uddin
(74) *Attorney, Agent, or Firm* — Hickman Palermo Becker Bingham LLP

(57) ABSTRACT

Systems and methods for providing full data provenance visualization for versioned datasets. A method includes receiving selection of a versioned dataset that is within a data pipeline system. The method also includes determining the full data provenance of the selected versioned dataset. The full data provenance may comprise a set of versioned datasets. The method further includes providing for display of a visualization of the full data provenance of the selected versioned dataset. The visualization comprises a graph. The graph comprises a compound node for the selected versioned dataset and for each versioned dataset in the set of versioned datasets. The graph further comprises edges connecting the compounds nodes. Each edge represents a derivation dependency between versions of the versioned datasets represented by the compound nodes connected by the edge.

13 Claims, 6 Drawing Sheets

(56) References Cited

U.S. PATENT DOCUMENTS

| | | | |
|---|---|---|---|
| 5,818,737 A | 10/1998 | Orr et al. |
| 5,845,300 A | 12/1998 | Comer |
| 6,057,757 A | 5/2000 | Arrowsmith et al. |
| 6,091,956 A | 7/2000 | Hollenberg |
| 6,094,653 A | 7/2000 | Li et al. |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,289,338 B1 | 9/2001 | Stoffel et al. |
| 6,341,310 B1 | 1/2002 | Leshem et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,463,404 B1 | 10/2002 | Appleby |
| 6,523,172 B1 | 2/2003 | Martines-Guerra et al. |
| 6,539,538 B1 | 3/2003 | Brewster et al. |
| 6,549,752 B2 | 4/2003 | Tsukamoto |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,643,613 B2 | 11/2003 | McGee et al. |
| 6,714,936 B1 | 3/2004 | Nevin, III |
| 6,748,481 B1 | 6/2004 | Parry et al. |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,027,974 B1 | 4/2006 | Busch et al. |
| 7,028,223 B1 | 4/2006 | Kolawa et al. |
| 7,036,085 B2 | 4/2006 | Barros |
| 7,043,702 B2 | 5/2006 | Chi et al. |
| 7,055,110 B2 | 5/2006 | Kupka et al. |
| 7,089,541 B2 | 8/2006 | Ungar |
| 7,117,430 B2 | 10/2006 | Maguire et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,194,680 B1 | 3/2007 | Roy et al. |
| 7,237,192 B1 | 6/2007 | Stephenson et al. |
| 7,240,330 B2 | 7/2007 | Fairweather |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Joseph |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,685,083 B2 | 3/2010 | Fairweather |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,739,246 B2 | 6/2010 | Mooney et al. |
| 7,756,843 B1 | 7/2010 | Palmer |
| 7,761,407 B1 | 7/2010 | Stern |
| 7,770,100 B2 | 8/2010 | Chamberlain et al. |
| 7,800,796 B2 | 9/2010 | Saito |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,818,658 B2 | 10/2010 | Chen |
| 7,870,493 B2 | 1/2011 | Pall et al. |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,117,022 B2 | 2/2012 | Linker |
| 8,132,149 B2 | 3/2012 | Shenfield et al. |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,271,948 B2 | 9/2012 | Talozi et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,332,354 B1 | 12/2012 | Chatterjee et al. |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |

(56) References Cited

U.S. PATENT DOCUMENTS

| | | |
|---|---|---|
| 8,418,085 B2 | 4/2013 | Snook et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,494,984 B2 | 7/2013 | Hwang et al. |
| 8,510,304 B1 | 8/2013 | Briggs |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,494 B1 | 10/2013 | Downing et al. |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,601,326 B1 | 12/2013 | Kirn |
| 8,620,641 B2 | 12/2013 | Farnsworth et al. |
| 8,646,080 B2 | 2/2014 | Williamson et al. |
| 8,639,757 B1 | 3/2014 | Adams et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,689,182 B2 | 4/2014 | Leithead et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,799,799 B1 | 5/2014 | Cervelli et al. |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,838,556 B1 | 9/2014 | Reiner et al. |
| 8,855,999 B1 | 10/2014 | Elliot |
| 8,868,537 B1 | 10/2014 | Colgrove et al. |
| 8,903,717 B2 | 12/2014 | Elliot |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,897 B2 | 1/2015 | Nassar |
| 8,937,619 B2 | 1/2015 | Sharma et al. |
| 8,938,434 B2 | 1/2015 | Shankar et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,146,954 B1 | 9/2015 | Boe et al. |
| 9,201,920 B2 | 12/2015 | Jain et al. |
| 9,208,159 B2 | 12/2015 | Stowe et al. |
| 9,223,773 B2 | 12/2015 | Isaacson |
| 9,229,952 B1 | 1/2016 | Meacham et al. |
| 9,230,060 B2 | 1/2016 | Jain et al. |
| 9,230,280 B1 | 1/2016 | Maag et al. |
| 9,280,532 B2 | 3/2016 | Cicerone |
| 9,576,015 B1 | 2/2017 | Tolnay et al. |
| 2001/0056522 A1 | 12/2001 | Satyanarayana |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194058 A1 | 12/2002 | Friedlander et al. |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0074187 A1 | 4/2003 | Ait-Mokhtar et al. |
| 2003/0088438 A1 | 5/2003 | Eldering |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0171942 A1 | 9/2003 | Maughan et al. |
| 2003/0172053 A1 | 9/2003 | Fairweather |
| 2003/0177112 A1 | 9/2003 | Gardner |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044992 A1 | 3/2004 | Muller et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153837 A1 | 8/2004 | Preston et al. |
| 2004/0163039 A1 | 8/2004 | McPherson et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0102328 A1 | 5/2005 | Gaito |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0095521 A1 | 5/2006 | Patinkin |
| 2006/0106847 A1 | 5/2006 | Eckardt et al. |
| 2006/0129746 A1 | 6/2006 | Porter |

(56) References Cited

U.S. PATENT DOCUMENTS

| | | |
|---|---|---|
| 2006/0129992 A1 | 6/2006 | Oberholtzer et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218405 A1 | 9/2006 | Ama et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0271838 A1 | 11/2006 | Carro |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0074169 A1 | 3/2007 | Chess et al. |
| 2007/0078832 A1 | 4/2007 | Ott et al. |
| 2007/0078872 A1 | 4/2007 | Cohen |
| 2007/0083541 A1 | 4/2007 | Fraleigh et al. |
| 2007/0094389 A1 | 4/2007 | Nussey et al. |
| 2007/0112714 A1 | 5/2007 | Fairweather |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0034327 A1 | 2/2008 | Cisler et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0103996 A1 | 5/2008 | Forman et al. |
| 2008/0104019 A1 | 5/2008 | Nath |
| 2008/0104060 A1 | 5/2008 | Abhyankar et al. |
| 2008/0104407 A1 | 5/2008 | Horne et al. |
| 2008/0126951 A1 | 5/2008 | Sood et al. |
| 2008/0140387 A1 | 6/2008 | Linker |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0037417 A1 | 2/2009 | Shankar et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0198641 A1 | 8/2009 | Tortoriello |
| 2009/0199047 A1 | 8/2009 | Vaitheeswaran et al. |
| 2009/0222400 A1 | 9/2009 | Kupershmidt et al. |
| 2009/0222760 A1 | 9/2009 | Halverson et al. |
| 2009/0228507 A1 | 9/2009 | Jain et al. |
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0281839 A1 | 11/2009 | Lynn et al. |
| 2009/0282097 A1 | 11/2009 | Alberti et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0310816 A1* | 12/2009 | Freire ............... G06F 17/30312 382/100 |
| 2009/0313463 A1 | 12/2009 | Pang et al. |
| 2009/0319295 A1 | 12/2009 | Kass-Hout et al. |
| 2009/0319418 A1 | 12/2009 | Herz |
| 2009/0319891 A1 | 12/2009 | MacKinlay |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0082532 A1 | 4/2010 | Shaik et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114629 A1* | 5/2010 | Adler .................... G06Q 10/00 705/7.36 |
| 2010/0114887 A1 | 5/2010 | Conway et al. |
| 2010/0122152 A1 | 5/2010 | Chamberlain et al. |

(56) References Cited

U.S. PATENT DOCUMENTS

| | | |
|---|---|---|
| 2010/0125470 A1 | 5/2010 | Chisholm |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0211550 A1 | 8/2010 | Daniello et al. |
| 2010/0228786 A1 | 9/2010 | Torok |
| 2010/0228812 A1 | 9/2010 | Uomini |
| 2010/0235915 A1 | 9/2010 | Memon et al. |
| 2010/0250412 A1 | 9/2010 | Wagner |
| 2010/0257015 A1 | 10/2010 | Molander |
| 2010/0257515 A1 | 10/2010 | Bates et al. |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0181598 A1 | 7/2011 | O'Neall et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0213791 A1 | 9/2011 | Jain et al. |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0295795 A1 | 12/2011 | Venkatasubramanian et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0102006 A1 | 4/2012 | Larson |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0130937 A1 | 5/2012 | Leon et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290527 A1 | 11/2012 | Yalamanchilli |
| 2012/0290879 A1 | 11/2012 | Shibuya et al. |
| 2012/0296907 A1 | 11/2012 | Long et al. |
| 2012/0304150 A1 | 11/2012 | Leithead et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0006947 A1 | 1/2013 | Olumuyiwa et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0091084 A1 | 4/2013 | Lee |

(56) References Cited

U.S. PATENT DOCUMENTS

| | | |
|---|---|---|
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0124193 A1 | 5/2013 | Holmberg |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | Ei-Yaniv et al. |
| 2013/0198565 A1 | 8/2013 | Mancoridis et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226879 A1 | 8/2013 | Ring et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0246316 A1 | 9/2013 | Talukder et al. |
| 2013/0246537 A1 | 9/2013 | Gaddala |
| 2013/0246560 A1 | 9/2013 | Feng et al. |
| 2013/0246597 A1 | 9/2013 | Iizawa et al. |
| 2013/0251233 A1 | 9/2013 | Yang et al. |
| 2013/0262403 A1 | 10/2013 | Milousheff |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0275446 A1 | 10/2013 | Jain et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2014/0012796 A1 | 1/2014 | Petersen et al. |
| 2014/0019423 A1 | 1/2014 | Liensberger et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0156617 A1 | 6/2014 | Tomkins |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279979 A1 | 9/2014 | Yost et al. |
| 2014/0310266 A1 | 10/2014 | Greenfield |
| 2014/0316911 A1 | 10/2014 | Gross |
| 2014/0324876 A1 | 10/2014 | Konik et al. |
| 2014/0324929 A1 | 10/2014 | Mason |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0039886 A1 | 2/2015 | Kahol et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100559 A1 | 4/2015 | Nassar |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0112998 A1 | 4/2015 | Shankar |
| 2015/0134666 A1 | 5/2015 | Gattiker et al. |
| 2015/0135256 A1 | 5/2015 | Hoy et al. |
| 2015/0142766 A1 | 5/2015 | Jain et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188715 A1 | 7/2015 | Castellucci et al. |
| 2015/0188872 A1 | 7/2015 | White |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0242397 A1 | 8/2015 | Zhuang |
| 2015/0261817 A1 | 9/2015 | Harris et al. |
| 2015/0261847 A1 | 9/2015 | Ducott et al. |
| 2015/0324868 A1 | 11/2015 | Kaftan et al. |
| 2015/0338233 A1 | 11/2015 | Cervelli et al. |
| 2015/0341467 A1 | 11/2015 | Lim et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0004764 A1 | 1/2016 | Chakerian et al. |
| 2016/0034545 A1 | 2/2016 | Shankar et al. |
| 2016/0062555 A1 | 3/2016 | Ward et al. |
| 2016/0098173 A1 | 4/2016 | Slawinski et al. |
| 2016/0125000 A1 | 5/2016 | Meacham et al. |
| 2016/0147730 A1 | 5/2016 | Cicerone |
| 2016/0179828 A1 | 6/2016 | Ellis |
| 2017/0068698 A1 | 3/2017 | Tolnay et al. |
| 2017/0083595 A1 | 3/2017 | Tolnay et al. |
| 2017/0097950 A1 | 4/2017 | Meacham et al. |

FOREIGN PATENT DOCUMENTS

| | | |
|---|---|---|
| CA | 2666364 | 1/2015 |
| CN | 102546446 | 7/2012 |
| CN | 103167093 | 6/2013 |

(56) References Cited

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204840 | 9/2014 |
| DE | 202014204834 | 9/2014 |
| DE | 102014213036 | 1/2015 |
| DE | 102014215621 | 2/2015 |
| EP | 0652513 | 5/1995 |
| EP | 1566758 | 8/2005 |
| EP | 1672527 | 6/2006 |
| EP | 1962222 | 8/2008 |
| EP | 2221725 | 8/2010 |
| EP | 2487610 | 8/2012 |
| EP | 2551799 | 1/2013 |
| EP | 2560134 | 2/2013 |
| EP | 2778913 | 9/2014 |
| EP | 2778914 | 9/2014 |
| EP | 2778977 | 9/2014 |
| EP | 2778986 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2897051 | 7/2015 |
| EP | 2911078 | 8/2015 |
| EP | 2963595 | 1/2016 |
| EP | 2993595 | 3/2016 |
| EP | 3 018 553 A1 | 5/2016 |
| EP | 3128447 | 2/2017 |
| EP | 3142027 | 3/2017 |
| GB | 2366498 | 3/2002 |
| GB | 2513007 | 10/2014 |
| GB | 2516155 | 1/2015 |
| GB | 2517582 | 2/2015 |
| GB | 2518745 | 4/2015 |
| NL | 2012778 | 11/2014 |
| NL | 2013134 | 1/2015 |
| NL | 2013306 | 2/2015 |
| NL | 2011642 | 8/2015 |
| NZ | 624557 | 12/2014 |
| WO | WO 2000/009529 | 2/2000 |
| WO | WO 2002/035376 | 5/2002 |
| WO | WO 2002/065353 | 8/2002 |
| WO | WO 2003/060751 | 7/2003 |
| WO | WO 2005/010685 | 2/2005 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/0098958 | 9/2010 |
| WO | WO 2011/017289 | 5/2011 |
| WO | WO 2011/071833 | 6/2011 |
| WO | WO 2012/025915 | 3/2012 |
| WO | WO 2012/079836 | 6/2012 |
| WO | WO 2013/010157 | 1/2013 |
| WO | WO 2013/067077 | 5/2013 |
| WO | WO 2013/0102892 | 7/2013 |

OTHER PUBLICATIONS

Hur et al., "SciMiner: web-based literature mining tool for target identification and functional enrichment analysis," Bioinformatics 25.6 (2009): pp. 838-840.

Official Communication for New Zealand Patent Application No. 622513 dated Apr. 3, 2014.

Official Communication for Israel Patent Application No. 198253 dated Nov. 24, 2014.

Official Communication for Great Britain Patent Application No. 1413935.6 dated Jan. 27, 2015.

Official Communication for Australian Patent Application No. 2014201506 dated Feb. 27, 2015.

Official Communication for Australian Patent Application No. 2014201507 dated Feb. 27, 2015.

Official Communication for Australian Patent Application No. 2014201580 dated Feb. 27, 2015.

Zheng et al., "GOEAST: a web-based software toolkit for Gene Ontology enrichment analysis," Nucleic acids research 36.suppl 2 (2008): pp. W385-W363.

Horrocks et al., "The Effects of Weather on Crime", dated 2008, 40 pages.

Aldor-Noiman et al., "Spatio-Temporal Low Count Processes with Application to Violent Crimes Events", dated Apr. 23, 2013, 44 pages.

Azavea Journal, HunchLab: Heat Map and Kernel Density Calculation for Crime Analysis, dated 2009, 2 pages.

Bowers et al., "Prospective Hot Spotting", The Future of Crime Mapping?, Advance Access Publication dated May 7, 2004, 18 pages.

Butke et al., "An Analysis of the Relationship Between Weather and Aggressive Crime in Cleveland, Ohio", American Meteorological Society, dated Apr. 2010, 13 pages.

Caplan, Joel M. Mapping the Spatial Influence of Crime Correlates: A Comparision of Operationalization Schemes and Implications for Crime Analysis and Criminal Justice Practice dated 2011, 27 pages Chainey et al., "The Utility of Hotspot Mapping for Predicting Spatial Patterns of Crime", Security Journal, dated 2008, 25 pages.

Gorr et al., Crime Hot Spot Forecasting: Modeling and Comparative Evaluation, dated 2002, 37 pages.

"CrimeStat Statistics Program", http://www.icpsr.umich.edi/NACJD/crimestat.html, accessed Mar. 31, 2014, 5 pages.

Groff et al., "Forecasting the Future of Predictive Crime Mapping", Crime Prevention Studies, dated 2002 vol. 13, 29 pages.

Valentini et al., Ensembles of Learning Machines, dated 2002, 18 pages.

Jacob et al., "The Dynamics of Criminal Behavior: Evidence From Weather Shocks", NBER Working Paper Series, National Bureau of Economic Research, dated Sep. 2004, 59 pages.

Karuppannan et al., "Crime Analysis Mapping in India": A GIS Implementation in Chennai City, dated 2000, 25 pages.

Kong, Steve, "Return of the Burglar", Masters Course in Crime Science, dated Sep. 2005, 52 pages.

Mohler et al., "Self-Exciting Point Process Modeling of Crime", American Statistical Association, dated 2011, 9 pages.

Olligschlaeger, Andreas, "Artificial Neural Networks and Crime Mapping", Carnegie Mellon University, dated 1997, 35 pages.

Ravi et al., "Soft Computing System for Bank Performance Prediction", dated 2007, 11 pages.

Rayment, "Spatial and Temporal Crime Analysis Techniques", dated 1995, 12 pages.

Short et al., "Measuring and Modeling Repeat and Near-Repeat Burglary Effects", Springerlink,.com, dated 2009, 15 pages.

Gorr, "Proposed Crime Early Warning System Software", dated 2003, 4 pages.

Official Communication for European Patent Application No. 14158977.0 dated Apr. 16, 2015.

Official Communication for European Patent Application No. 14158958.0 dated Apr. 16, 2015.

Official Communication for Netherlands Patent Application No. 2013306 dated Apr. 24, 2015.

"A Tour of Pinboard," <http://pinboard.in/tour> as printed May 15, 2014, 6 pages.

(56) References Cited

OTHER PUBLICATIONS

"BackTuIt—JD Edwards One World Version Control System," printed Jul. 23, 2007, 1 page.
Boytsov et al., "Drake: The Data Processing Workflow Tool (A.K.A. "Make for Data")", Specification and User Manual, working spec as of Jan. 21, 2013, 61 pages.
Delicious, <http://delicious.com/> as printed May 15, 2014 in 1 page.
Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.
Johnson, Maggie "Introduction to YACC and Bison", Handout 13, Dated Jul. 8, 2005, 11 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Morrison et al., "Converting Users to Testers: An Alternative Approach to Load Test Script Creation, Parameterization and Data Corellation," CCSC Southeastern Conference, JCSC 28, 2, Dec. 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nivas, Tuli, "Test Harness and Script Design Principles for Automated Testing of non-GUI or Web Based Applications," Performance Lab, Jun. 2011, pp. 30-37.
Official Communication for European Patent Application No. 14159629.6 dated Jul. 31, 2014.
Official Communication for Great Britain Patent Application No. 1404479.6 dated Aug. 12, 2014.
Official Communication for New Zealand Patent Application No. 622497 dated Mar. 26, 2014.
Official Communication for New Zealand Patent Application No. 622389 dated Mar. 20, 2014.
Official Communication for New Zealand Patent Application No. 622414 dated Mar. 24, 2014.
Official Communication for European Patent Application No. 14158958.0 dated Jun. 3, 2014.
Official Communication for European Patent Application No. 14158977.0 dated Jun. 10, 2014.
Official Communication for New Zealand Patent Application No. 622404 dated Mar. 20, 2014.
Official Communication for New Zealand Patent Application No. 622484 dated Apr. 2, 2014.
Official Communication for Canadian Patent Application No. 2666364 dated Jun. 4, 2012.
Official Communication for New Zealand Patent Application No. 622497 dated Jun. 19, 2014.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Wollrath et al., "A Distributed Object Model for the Java System," Conference on Object-Oriented Technologies and Systems, Jun. 17-21, 1996, pp. 219-231.
European Claims in application No. 15192965.0-1957, dated Mar. 2016, 3 pages.
European Patent Office, "Search Report" in application No. 15192965.0-1957, dated Mar. 17, 2016, 7 pages.
Notice of Acceptance for Australian Patent Application No. 2014203669 dated Jan. 21, 2016.
Official Communication for Netherlands Patent Application No. 2013134 dated Apr. 20, 2015.
Official Communication for Great Britain Patent Application No. 1411984.6 dated Jan. 8, 2016.
Official Communication for European Patent Application No. 15165244.3 dated Aug. 27, 2015.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/retrieved on Aug. 20, 2015.
Palantir Technolgies, "Palantir Labs—Timeline," Oct. 1, 2010, retrieved from the internet https://www.youtube.com/watch?v=JCgDW5bru9M retrieved on Aug. 19, 2015.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Official Communication for European Patent Application No. 14200246.8 dated May 29, 2015.
Official Communication for Netherlands Patent Application No. 2012417 dated Sep. 18, 2015.
Wikipedia, "Multimap," Jan. 1, 2013, https://en.wikipedia.org/w/index.php?title=Multimap&oldid=530800748.
Official Communication for Netherlands Patent Application No. 2012421 dated Sep. 18, 2015.
Official Communication for European Patent Application No. 15184764.7 dated Dec. 14, 2015.
Official Communication for Netherlands Patent Application No. 2012438 dated Sep. 21, 2015.
Chaudhuri et al., "An Overview of Business Intelligence Technology," Communications of the ACM, Aug. 2011, vol. 54, No. 8.
Official Communication for European Patent Application No. 15166137.8 dated Sep. 14, 2015.
Jelen, Bill, "Excell 2013 in Depth, Video Enhanced Edition," Jan. 25, 2013.
Zaharia et al., "Resilient Distributed Datasets: A Fault-Tolerant Abstraction for In-Memory Cluster Computing", dated 2012, 14 pages.
Osterweil et al., "Capturing, Visualizing and Querying Scientific Data Provenance", http://www.mtholyoke.edu/-blerner/dataprovenance/ddg.html, dated May 20, 2015, 3 pages.
Dean et al., "MapReduce: Simpli] ed Data Processing on Large Clusters", OSDI 2004, 13 pages.
Official Communication for New Zealand Patent Application No. 624557 dated May 14, 2014.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.

(56) References Cited

OTHER PUBLICATIONS

Official Communication for New Zealand Patent Application No. 627061 dated Jul. 14, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for European Patent Application No. 14159464.8 dated Aug. 20, 2014.
Official Communication for European Patent Application No. 14159464.8 dated Sep. 22, 2014.
Official Communication for New Zealand Patent Application No. 628840 dated Aug. 28, 2014.
Official Communication in New Zealand Patent Application No. 628495 dated Aug. 19, 2014.
Official Communication for Great Britain Patent Application No. 1408025.3 dated Nov. 6, 2014.
Official Communication for New Zealand Patent Application No. 628161 dated Aug. 25, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for European Patent Application No. 14180281.9 dated Jan. 26, 2015.
Official Communication for European Patent Application No. 14187996.5 dated Feb. 12, 2015.
Official Communication for European Patent Application No. 14180142.3 dated Feb. 6, 2015.
Official Communication for European Patent Application No. 14186225.0 dated Feb. 13, 2015.
Official Communication for European Patent Application No. 14189344.6 dated Feb. 20, 2015.
Official Communication for Australian Patent Application No. 2014201511 dated Feb. 27, 2015.
Official Communication for European Patent Application No. 14189347.9 dated Mar. 4, 2015.
Official Communication for European Patent Application No. 14199182.8 dated Mar. 13, 2015.
Official Communication for Australian Patent Application No. 2014202442 dated Mar. 19, 2015.
Official Communication for European Patent Application No. 14180321.3 dated Apr. 17, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14189802.3 dated May 11, 2015.
Official Communication for European Patent Application No. 14191540.5 dated May 27, 2015.
Official Communication for Australian Patent Application No. 2014213553 dated May 7, 2015.
Official Communication for Australian Patent Application No. 2014203669 dated May 29, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014250678 dated Jun. 17, 2015.
Official Communication for European Patent Application No. 14180432.8 dated Jun. 23, 2015.
Official Communication for European Patent Application No. 14199180.2 dated Jun. 22, 2015.

Official Communication for European Patent Application No. 14187739.9 dated Jul. 6, 2015.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues," 2001, pp. 859-864.
APPACTS, "Smart Thinking for Super Apps," <http://www.appacts.com> Printed Jul. 18, 2013 in 4 pages.
APSALAR, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Cohn et al., "Semi-supervised Clustering with User Feedback," Constrained Clustering: Advances in Algorithms, Theory, and Applications 4.1, 2003, pp. 17-32.
Countly Mobile Analytics, <http://count.ly/> Printed Jul. 18, 2013 in 9 pages.
DISTIMO—App Analytics, <http://www.distimo.com/app-analytics> Printed Jul. 18, 2013 in 5 pages.
Flurry Analytics, <http://www.flurry.com/> Printed Jul. 18, 2013 in 14 pages.
Google Analytics Official Website—Web Analytics & Reporting, <http://www.google.com/analytics.index.html> Printed Jul. 18, 2013 in 22 pages.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in 18 pages.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Official Communication for New Zealand Patent Application No. 622473 dated Mar. 27, 2014.
Official Communication for New Zealand Patent Application No. 622473 dated Jun. 19, 2014.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for European Patent Application No. 14197938.5 dated Apr. 28, 2015.

(56) References Cited

OTHER PUBLICATIONS

Official Communication for European Patent Application No. 14200298.9 dated May 13, 2015.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for European Patent Application No. 14199180.2 dated Aug. 31, 2015.
Official Communication for European Patent Application No. 15181419.1 dated Sep. 29, 2015.
U.S. Appl. No. 14/533,433, filed Nov. 5, 2014, Office Action, dated Feb. 26, 2015.
U.S. Appl. No. 14/319,161, filed Jun. 30, 2014, Final Office Action, dated Jan. 23, 2015.
U.S. Appl. No. 14/490,612, filed Sep. 18, 2014, Office Action, dated Jan. 27, 2015.
U.S. Appl. No. 14/508,696, filed Oct. 7, 2014, Office Action, dated Mar. 2, 2015.
U.S. Appl. No. 14/319,161, filed Jun. 30, 2014, Notice of Allowance, dated May 4, 2015.
U.S. Appl. No. 14/044,800, filed Oct. 2, 2013, Notice of Allowance, dated Sep. 2, 2014.
U.S. Appl. No. 14/148,568, filed Jan. 6, 2014, Final Office Action, dated Oct. 22, 2014.
U.S. Appl. No. 14/148,568, filed Jan. 6, 2014, Office Action, dated Mar. 26, 2015.
U.S. Appl. No. 14/025,653, filed Sep. 12, 2013, Office Action Interview, dated Oct. 6, 2015.
U.S. Appl. No. 14/134,558, filed Dec. 19, 2013, Office Action, dated Oct. 7, 2015.
U.S. Appl. No. 14/025,653, filed Sep. 12, 2013, Interview Summary, dated Mar. 3, 2016.
U.S. Appl. No. 14/874,690, filed Oct. 5, 2015, Notice of Allowance, dated Oct. 5, 2016.
U.S. Appl. No. 14/533,433, filed Nov. 5, 2014, Notice of Allowance, dated Sep. 1, 2015.
U.S. Appl. No. 14/879,916, filed Oct. 9, 2015, Notice of Allowance, dated Jun. 22, 2016.
U.S. Appl. No. 14/526,066, filed Mar. 25, 2014, Final Office Action, dated May 6, 2016.
U.S. Appl. No. 14/504,103, filed Oct. 1, 2014, Notice of Allowance, dated Sep. 9, 2014.
U.S. Appl. No. 14/306,138, filed Jun. 16, 2014, Final Office Action, dated Sep. 14, 2015.
U.S. Appl. No. 13/196,788, filed Aug. 2, 2011, Interview Summary, dated Nov. 25, 2015.
U.S. Appl. No. 14/923,374, filed Oct. 26, 2015, Notice of Allowance, dated May 8, 2014.
U.S. Appl. No. 14/134,558, filed Dec. 19, 2013, Final Office Action, dated May 16, 2016.
U.S. Appl. No. 13/196,788, filed Aug. 2, 2011, Notice of Allowance, dated Dec. 18, 2015.
U.S. Appl. No. 14/319,161, filed Jun. 30, 2014, Office Action, dated Sep. 25, 2014.
U.S. Appl. No. 13/557,100, filed Jul. 24, 2012, Final Office Action, dated Apr. 7, 2016.
U.S. Appl. No. 14/631,633, filed Feb. 25, 2015, First Office Interview, dated Feb. 3, 2016.
U.S. Appl. No. 14/148,568, filed Jan. 6, 2014, Notice of Allowance, dated Aug. 26, 2015.
U.S. Appl. No. 14/508,696, filed Oct. 7, 2014, Notice of Allowance, dated Jul. 27, 2015.
U.S. Appl. No. 14/526,066, filed Oct. 28, 2014, Office Action, dated Jan. 21, 2016.
U.S. Appl. No. 14/726,211, filed May 29, 2015, Office Action, dated Apr. 5, 2016.
U.S. Appl. No. 14/734,772, filed Jun. 9, 2015, Notice of Allowance, dated Apr. 27, 2016.
U.S. Appl. No. 14/841,338, filed Aug. 31, 2015, Office Action, dated Feb. 18, 2016.
U.S. Appl. No. 14/580,218, filed Dec. 23, 2014, Office Action, dated Jun. 7, 2016.
U.S. Appl. No. 14/961,830, filed Dec. 7, 2015, Office Action, dated May 20, 2016.
U.S. Appl. No. 14/849,454, filed Sep. 9, 2015, Notice of Allowance, dated May 25, 2016.
U.S. Appl. No. 14/996,179, filed Jan. 14, 2016, First Office Action Interview, dated May 20, 2016.
U.S. Appl. No. 14/578,389, filed Dec. 20, 2014, Office Action, dated Apr. 22, 2016.
U.S. Appl. No. 13/196,788, filed Aug. 2, 2011, Office Action, dated Oct. 23, 2015.
U.S. Appl. No. 14/734,772, filed Jun. 9, 2015, First Office Action Interview, dated Oct. 30, 2015.
U.S. Appl. No. 14/578,389, filed Dec. 20, 2014, Office Action, dated Oct. 21, 2015.
U.S. Appl. No. 14/879,916, filed Oct. 9, 2015, First Office Action Interview, dated Apr. 15, 2016.
U.S. Appl. No. 14/278,963, filed May 15, 2014, Notice of Allowance, dated Sep. 2, 2015.
U.S. Appl. No. 15/287,715, filed Oct. 6, 2016, Office Action, dated Aug. 16, 2017.
U.S. Appl. No. 14/954,680, filed Nov. 30, 2015, Office Action, dated May 12, 2016.
U.S. Appl. No. 15/369,753, filed Dec. 5, 2016, First Office Action Interview, dated Aug. 28, 2017.
U.S. Appl. No. 14/874,690, filed Oct. 5, 2015, Office Action, dated Jun. 1, 2016.
U.S. Appl. No. 13/922,437, filed Jun. 20, 2013, Notice of Allowance, dated Jul. 3, 2014.
U.S. Appl. No. 15/262,207, filed Sep. 12, 2016, Final Office Action, dated Jun. 8, 2017.
U.S. Appl. No. 15/262,207, filed Sep. 12, 2017, Office Action, dated Feb. 21, 2017.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
Acklen, Laura, "Absolute Beginner's Guide to Microsoft Word 2003," Dec. 24, 2003. pp. 15-18, 34-41, 308-316.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

(56) References Cited

OTHER PUBLICATIONS

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp- 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14$^{th}$ International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Johnson, Steve, "Access 2013 on demand," Access 2013 on Demand, May 9, 2013, Que Publishing.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture." 2010. pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
Pythagoras Communications Ltd., "Microsoft CRM Duplicate Detection," Sep. 13, 2011, https://www.youtube.com/watch?v=j-7Qis0D0Kc.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI." The NCBI Handbook. Oct. 2002. pp. 1-11.
"The FASTA Program Package," fasta-36.3.4, Mar. 25, 2011, pp. 29.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
U.S. Appl. No. 14/746,671, filed Jun. 22, 2015, Notice of Allowance, dated Jan. 21, 2016.
U.S. Appl. No. 14/225,006, filed Mar. 25, 2014, Advisory Action, dated Dec. 21, 2015.
U.S. Appl. No. 14/306,147, filed Jun. 16, 2014, Final Office Action, dated Dec. 24, 2015.
U.S. Appl. No. 14/800,447, filed Jul. 15, 2012, First Office Action Interview, dated Dec. 10, 2010.
U.S. Appl. No. 14/306,138, filed Jun. 16, 2014, Interview Summary, dated Dec. 24, 2015.
U.S. Appl. No. 14/225,084, filed Mar. 25, 2014, Interview Summary, dated Jan. 4, 2016.
U.S. Appl. No. 14/306,138, filed Jun. 16, 2014, Interview Summary, dated Dec. 3, 2015.
U.S. Appl. No. 14/746,671, filed Jun. 22, 2015, First Office Action Interview, dated Nov. 12, 2015.

(56) References Cited

OTHER PUBLICATIONS

U.S. Appl. No. 14/948,009, filed Nov. 20, 2015, First Action Interview, dated Feb. 25, 2016.
U.S. Appl. No. 14/645,304, filed Mar. 11, 2015, Office Action, dated Jan. 25, 2016.
U.S. Appl. No. 14/874,690, filed Oct. 5, 2015, First Action Interview, dated Dec. 21, 2015.
U.S. Appl. No. 14/319,765, filed Jun. 30, 2014, Office Action, dated Feb. 1, 2016.
U.S. Appl. No. 13/247,987, filed Sep. 28, 2011, Notice of Allowance, dated Mar. 17, 2016.
U.S. Appl. No. 14/877,229, filed Oct. 7, 2015, Office Action, dated Mar. 22, 2016.
U.S. Appl. No. 14/306,138, filed Jun. 16, 2014, Office Action, dated Mar. 17, 2016.
U.S. Appl. No. 14/306,154, filed Jun. 16, 2014, Office Action, dated Mar. 17, 2016.
U.S. Appl. No. 14/323,935, filed Jul. 3, 2014, Notice of Allowance, dated Oct. 1, 2015.
U.S. Appl. No. 14/948,009, filed Nov. 20, 2015, Notice of Allowance, dated May 6, 2016.
U.S. Appl. No. 14/094,418, filed Dec. 2, 2013, Notice of Allowance, dated Jan. 25, 2016.
U.S. Appl. No. 14/223,918, filed Mar. 24, 2014, Notice of Allowance, dated Jan. 6, 2016.
U.S. Appl. No. 14/849,545, filed Sep. 9, 2015, Office Action, dated Jan. 29, 2016.
U.S. Appl. No. 14/849,545, filed Sep. 9, 2015, Interview Summary, dated Feb. 24, 2016.
U.S. Appl. No. 14/102,394, filed Dec. 10, 2013, Notice of Allowance, dated Aug. 25, 2014.
U.S. Appl. No. 14/108,187, filed Dec. 16, 2013, Notice of Allowance, dated Aug. 29, 2014.
U.S. Appl. No. 14/135,289, filed Dec. 19, 2013, Notice of Allowance, dated Oct. 14, 2014.
U.S. Appl. No. 14/268,964, filed May 2, 2014, Notice of Allowance, dated Dec. 3, 2014.
U.S. Appl. No. 14/616,080, filed Feb. 6, 2015, Notice of Allowance, dated Apr. 2, 2015.
U.S. Appl. No. 14/486,994, filed Sep. 15, 2014, Notice of Allowance, dated May 1, 2015.
U.S. Appl. No. 14/225,084, filed Mar. 25, 2014, Notice of Allowance, dated May 4, 2015.
U.S. Appl. No. 14/504,103, filed Oct. 1, 2014, Notice of Allowance, dated May 18, 2015.
U.S. Appl. No. 14/289,596, filed May 28, 2014, First Office Action Interview, dated Jul. 18, 2014.
U.S. Appl. No. 14/289,599, filed May 28, 2014, First Office Action Interview, dated Jul. 22, 2014.
U.S. Appl. No. 14/294,098, filed Jun. 2, 2014, First Office Action Interview, dated Aug. 15, 2014.
U.S. Appl. No. 14/148,568, filed Jan. 6, 2014, Final Office, dated Oct. 22, 2014.
U.S. Appl. No. 14/294,098, filed Jun. 2, 2014, Final Office Action, dated Nov. 6, 2014.
U.S. Appl. No. 14/306,147, filed Jun. 16, 2014, First Office Action Interview, dated Sep. 9, 2014.
U.S. Appl. No. 14/306,154, filed Jun. 16, 2014, First Office Action Interview, dated Sep. 9, 2014.
U.S. Appl. No. 14/319,765, filed Jun. 30, 2014, First Office Action Interview, dated Nov. 25, 2014.
U.S. Appl. No. 14/323,935, filed Jul. 3, 2014, First Office Action Interview, dated Nov. 28, 2014.
U.S. Appl. No. 14/326,738, filed Jul. 9, 2014, First Office Action Interview, dated Dec. 2, 2014.
U.S. Appl. No. 14/225,160, filed Mar. 25, 2014, First Office Action Interview, dated Oct. 22, 2014.
U.S. Appl. No. 14/289,596, filed May 28, 2014, Final Office Action, dated Jan. 26, 2015.
U.S. Appl. No. 14/306,154, filed Jun. 16, 2014, Final Office Action, dated Mar. 11, 2015.
U.S. Appl. No. 13/247,987, filed Sep. 28, 2011, Office Action, dated Apr. 2, 2015.
U.S. Appl. No. 14/196,814, filed Mar. 4, 2014, Office Action, dated May 5, 2015.
U.S. Appl. No. 14/639,606, filed Mar. 5, 2015, First Office Action Interview, dated May 18, 2015.
U.S. Appl. No. 14/579,752, filed Dec. 22, 2014, First Office Action Interview, dated May 26, 2015.
U.S. Appl. No. 14/306,154, filed Jun. 16, 2014, Advisory Action, dated May 15, 2015.
U.S. Appl. No. 14/289,599, filed May 28, 2014, Final Office Action, dated May 29, 2015.
U.S. Appl. No. 14/225,160, filed Mar. 25, 2014, Advisory Action, dated May 20, 2015.
U.S. Appl. No. 14/289,596, filed May 28, 2014, Advisory Action, dated Apr. 30, 2015.
U.S. Appl. No. 14/319,765, filed Jun. 30, 2014, Final Office Action, dated Jun. 16, 2015.
U.S. Appl. No. 14/306,138, filed Jun. 16, 2014, Office Action, dated May 26, 2015.
U.S. Appl. No. 13/835,688, filed Mar. 15, 2013, First Office Action Interview, dated Jun. 17, 2015.
U.S. Appl. No. 14/323,935, filed Jul. 3, 2014, Office Action, dated Jun. 22, 2015.
U.S. Appl. No. 14/225,160, filed Mar. 25, 2014, First Office Action Interview, dated Jul. 29, 2014.
U.S. Appl. No. 14/225,084, filed Mar. 25, 2014, First Office Action Interview, dated Sep. 2, 2014.
U.S. Appl. No. 14/225,006, filed Mar. 25, 2014, First Office Action Interview, dated Sep. 10, 2014.
U.S. Appl. No. 14/225,160, filed Mar. 25, 2014, Office Action, dated Aug. 12, 2015.
U.S. Appl. No. 14/225,006, filed Mar. 25, 2014, First Office Action Interview, dated Feb. 27, 2015.
U.S. Appl. No. 14/225,084, filed Mar. 25, 2014, First Office Action Interview, dated Feb. 20, 2015.
U.S. Appl. No. 14/225,160, filed Mar. 25, 2014, Final Office Action, dated Feb. 11, 2015.
U.S. Appl. No. 14/473,860, filed Aug. 29, 2014, Notice of Allowance, dated Jan. 5, 2015.
U.S. Appl. No. 14/192,767, filed Feb. 27, 2014, Notice of Allowance, dated Dec. 16, 2014.
U.S. Appl. No. 14/294,098, filed Jun. 2, 2014, Notice of Allowance, dated Dec. 29, 2014.
U.S. Appl. No. 14/473,552, filed Aug. 29, 2014, Notice of Allowance, dated Jul. 24, 2015.
U.S. Appl. No. 14/306,138, filed Jun. 16, 2014, First Office Action Interview, dated Sep. 23, 2014.
U.S. Appl. No. 14/486,991, filed Sep. 15, 2014, Office Action, dated Mar. 10, 2015.
U.S. Appl. No. 13/831,791, filed Mar. 15, 2013, Office Action, dated Mar. 4, 2015.
U.S. Appl. No. 14/323,935, filed Jul. 3, 2014, First Office Action Interview, dated Mar. 31, 2015.
U.S. Appl. No. 14/326,738, filed Jul. 9, 2014, First Office Action Interview, dated Mar. 31, 2015.
U.S. Appl. No. 14/504,103, filed Oct. 1, 2014, First Office Action Interview, dated Mar. 31, 2015.
U.S. Appl. No. 15/504,103, filed Oct. 1, 2014, First Office Action Interview, dated Feb. 5, 2015.
U.S. Appl. No. 14/319,765, filed Jun. 30, 2014, First Office Action Interview, dated Feb. 4, 2015.
U.S. Appl. No. 14/306,138, filed Jun. 16, 2014, Final Office Action, dated Feb. 18, 2015.
U.S. Appl. No. 14/306,147, filed Jun. 16, 2014, Final Office Action, dated Feb. 19, 2015.
U.S. Appl. No. 14/473,552, filed Aug. 29, 2014, First Office Action Interview, dated Feb. 24, 2015.
U.S. Appl. No. 14/268,964, filed May 2, 2014, Office Action, dated Sep. 3, 2014.

(56) References Cited

OTHER PUBLICATIONS

U.S. Appl. No. 13/839,026, filed Mar. 15, 2013, Restriction Requirement, dated Apr. 2, 2015.
U.S. Appl. No. 12/556,318, filed Sep. 9, 2009, Office Action, dated Jul. 2, 2015.
U.S. Appl. No. 13/839,026, filed Mar. 15, 2013, Office Action, dated Aug. 4, 2015.
U.S. Appl. No. 14/306,154, filed Jun. 16, 2014, Office Action, dated Jul. 6, 2015.
U.S. Appl. No. 14/639,606, filed Mar. 5, 2015, First Office Action Interview, dated Jul. 24, 2015.
U.S. Appl. No. 14/326,738, filed Jul. 9, 2014, Final Office Action, dated Jul. 31, 2015.
U.S. Appl. No. 14/306,147, filed Jun. 16, 2014, Office Action, dated Aug. 7, 2015.
U.S. Appl. No. 14/579,752, filed Dec. 22, 2014, Final Office Action, dated Aug. 19, 2015.
U.S. Appl. No. 14/479,863, filed Sep. 8, 2014, Notice of Allowance, dated Mar. 31, 2015.
U.S. Appl. No. 14/552,336, filed Nov. 24, 2014, Notice of Allowance, dated Nov. 3, 2015.
U.S. Appl. No. 14/326,738, filed Jul. 2014, Notice of Allowance, dated Nov. 18, 2015.
U.S. Appl. No. 14/451,221, filed Aug. 4, 2014, Office Action, dated Oct. 21, 2014.
U.S. Appl. No. 14/463,615, filed Aug. 19, 2014, First Office Action Interview, dated Nov. 13, 2014.
U.S. Appl. No. 13/827,491, filed Mar. 14, 2013, Office Action, dated Dec. 1, 2014.
U.S. Appl. No. 14/479,863, filed Sep. 8, 2014, First Office Action Interview, dated Dec. 26, 2014.
U.S. Appl. No. 14/483,527, filed Sep. 11, 2014, First Office Action Interview, dated Jan. 28, 2015.
U.S. Appl. No. 14/463,615, filed Aug. 19, 2014, First Office Action Interview, dated Jan. 28, 2015.
U.S. Appl. No. 14/571,098, filed Dec. 15, 2014, First Office Action Interview, dated Mar. 11, 2015.
U.S. Appl. No. 14/463,615, filed Aug. 19, 2014, Final Office Action, dated May 21, 2015.
U.S. Appl. No. 13/827,491, filed Mar. 14, 2013, Final Office Action, dated Jun. 22, 2015.
U.S. Appl. No. 14/483,527, filed Sep. 11, 2014, Final Office Action, dated Jun. 22, 2015.
U.S. Appl. No. 14/552,336, filed Nov. 24, 2014, First Office Action Interview, dated Jul. 20, 2015.
U.S. Appl. No. 14/676,621, filed Apr. 1, 2015, First Office Action Interview, dated Jul. 30, 2015.
U.S. Appl. No. 14/571,098, filed Dec. 15, 2014, First Office Action Interview, dated Aug. 5, 2015.
U.S. Appl. No. 14/225,006, filed Mar. 25, 2014, Final Office Action, dated Sep. 2, 2015.
U.S. Appl. No. 14/631,633, filed Feb. 25, 2015, First Office Action Interview, dated Sep. 10, 2015.
U.S. Appl. No. 14/463,612, filed Aug. 19, 2014, Advisory Action, dated Sep. 10, 2015.
U.S. Appl. No. 14/306,138, filed Jun. 16, 2014, First Office Action Interview, dated Sep. 23, 2015.
U.S. Appl. No. 14/676,621, filed Apr. 1, 2015, Final Office Action, dated Oct. 29, 2015.
U.S. Appl. No. 14/319,765, filed Jun. 30, 2014, Advisory Action, dated Sep. 10, 2015.
U.S. Appl. No. 14/574,098, filed Dec. 15, 2014, First Office Action Interview, dated Aug. 24, 2015.
U.S. Appl. No. 14/225,084, filed Mar. 25, 2014, Office Action, dated Sep. 11, 2015.
U.S. Appl. No. 14/562,524, filed Dec. 5, 2014, First Office Action Interview, dated Sep. 14, 2015.
U.S. Appl. No. 14/813,749, filed Jul. 30, 2015, Office Action, dated Sep. 28, 2015.
U.S. Appl. No. 14/746,671, filed Jun. 22, 2015, First Office Action Interview, dated Sep. 28, 2015.
U.S. Appl. No. 14/141,252, filed Dec. 26, 2014, Office Action, dated Oct. 8, 2015.
U.S. Appl. No. 13/827,471, filed Mar. 14, 2013, Office Action, dated Oct. 9, 2015.
U.S. Appl. No. 14/483,527, filed Sep. 11, 2014, Office Action, dated Oct. 28, 2015.
U.S. Appl. No. 14/571,098, filed Dec. 15, 2014, First Office Action Interview, dated Nov. 10, 2015.
U.S. Appl. No. 14/562,524, filed Dec. 5, 2014, First Office Action Interview, dated Nov. 10, 2015.
U.S. Appl. No. 14/306,154, filed Jun. 16, 2014, Final Office Action, dated Nov. 16, 2015.
U.S. Appl. No. 14/842,734, filed Sep. 1, 2015, First Office Action Interview, dated Nov. 19, 2015.
Official Communication for European Patent Application No. 16182336.4 dated Dec. 23, 2016.
Official Communication for Great Britain Patent Application No. 1413935.6 dated Dec. 21, 2015.
Official Communication for Netherlands Patent Application No. 2012436 dated Nov. 6, 2015.
Official Communication for Israel Patent Application No. 198253 dated Jan. 12, 2016.
QUEST, "Toad for ORACLE 11.6—Guide to Using Toad," Sep. 24, 2012, pp. 1-162.
Official Communication for European Patent Application No. 15155845.9 dated Oct. 6, 2015.
Official Communication for European Patent Application No. 14159464.8 dated Feb. 18, 2016.
Official Communication for European Patent Application No. 16188060.4 dated Feb. 6, 2017.
Official Communication for Netherlands Patent Application No. 2012434 dated Jan. 8, 2016.
Official Communication for European Patent Application No. 14158977.0 dated Mar. 11, 2016.
Symantec Corporation, "E-Security Begins with Sound Security Policies," Announcement Symantec, Jun. 14, 2001.
Official Communication for European Patent Application No. 14158958.0 dated Mar. 11, 2016.
Official Communication for European Patent Application No. 15183721.8 dated Nov. 23, 2015.
Official Communication for Great Britain Patent Application No. 1404479.6 dated Jul. 9, 2015.
European Claims in application No. 16182336.4-1952, dated Dec. 2016, 3 pages.
European Claims in application No. 16194936.7-1871, dated Mar. 3, 2017, 3 pages.
European Patent Office, "Search Report" in application No. 16182336.4-1952, dated Dec. 23, 2016, 10 pages.
European Patent Office, "Search Report" in application No. 16194936.7-1871, dated Mar. 9, 2017, 8 pages.

\* cited by examiner

PROVIDING FULL DATA PROVENANCE VISUALIZATION FOR VERSIONED DATASETS

CROSS-REFERENCE TO RELATED APPLICATION

This application is related to U.S. patent application Ser. No. 14/533,433, entitled "HISTORY PRESERVING DATA PIPELINE SYSTEM AND METHOD," and filed Nov. 5, 2014, the entire contents of which is hereby incorporated by reference as if fully set forth herein.

TECHNICAL FIELD

The subject innovations relate to graphical user interfaces for computer systems and, in particular, relates to providing full data provenance visualization for versioned datasets.

BACKGROUND

Computers are very powerful tools for processing data. A computerized data pipeline is a useful mechanism for processing large amounts of data. A typical data pipeline is an ad-hoc collection of computer software scripts and programs for processing data extracted from "data sources" and for providing the processed data to "data sinks". As an example, a data pipeline for a large insurance company that has recently acquired a number of smaller insurance companies might extract policy and claim data from the individual database systems of the smaller insurance companies, transform and validate the insurance data in some way, and provide validated and transformed data to various analytical platforms for assessing risk management, compliance with regulations, fraud, etc.

Between the data sources and the data sinks, a data pipeline system is typically provided as a software platform to automate the movement and transformation of data from the data sources to the data sinks. In essence, the data pipeline system shields the data sinks from having to interface with the data sources or even being configured to process data in the particular formats provided by the data sources. Typically, data from the data sources received by the data sinks is processed by the data pipeline system in some way. For example, a data sink may receive data from the data pipeline system that is a combination (e.g., a join) of data of from multiple data sources, all without the data sink being configured to process the individual constituent data formats.

One purpose of a data pipeline system is to execute data transformation steps on data obtained from data sources to provide the data in format expected by the data sinks. A data transformation step may be defined as a set of computer commands or instructions (e.g., a database query) which, when executed by the data pipeline system, transforms one or more input datasets to produce one or more output or "target" datasets. Data that passes through the data pipeline system may undergo multiple data transformation steps. Such a step can have dependencies on the step or steps that precede it. One example of a computer system for carrying out data transformation steps in a data pipeline is the well-known MapReduce system. See, e.g., Dean, Jeffrey, et al., "MapReduce: Simplified Data Processing on Large Clusters", Google, Inc., 2004. Another more recent example of a computer system for carrying out data transformation steps in a data pipeline is the Spark system. See, e.g., Zaharia, et al., "Resilient Distributed Datasets: A Fault-Tolerant Abstraction for In-Memory Cluster Computing", $9^{th}$ USENIX Symposium on Networked Systems Design and Implementation, 2012.

An important issue for users of data pipeline systems is provenance. In the context of data pipeline systems, provenance is metadata that describes the origins and history of datasets in their life cycles. Such metadata (sometimes also called "lineage") is important for many data pipeline tasks. In particular, provenance is important to users to help them judge whether a given dataset produced by the data pipeline system is trustworthy.

Given the increasing amount of data collected by businesses and other organizations, processing data of all sorts through data pipeline systems can only be expected to increase. This trend is coupled with a need for users to be able to visualize the provenance of datasets produced by data pipeline systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In one aspect, the subject innovations are embodied in a method for providing full data provenance visualization of versioned datasets. The method is performed at one or more computing devices having one or more processors and memory storing one or more programs executed by the one or more processors to perform the method. The method includes receiving selection of a versioned dataset that is within a data pipeline system. The method also includes determining full data provenance of the selected versioned dataset. The full data provenance comprises a set of versioned datasets. The method also includes providing for display of a visualization of the full data provenance of the selected versioned dataset. The visualization comprises a graph. The graph comprises a compound node for the selected versioned dataset and for each versioned dataset in the set of versioned datasets. The graph further comprises edges connecting the compounds nodes. Each edge represents a derivation dependency between versions of the versioned datasets represented by the compound nodes connected by the edge.

These and other embodiments of the subject innovations include one or more of the following features: The compound node of the selected versioned dataset may indicate a name or identifier of the selected version dataset. The compound node for each versioned dataset in the set of versioned datasets may indicate a name or identifier of the each versioned dataset. The compound node of the selected versioned dataset may comprise a sub-entry representing a particular version of the selected versioned dataset. The compound node for each versioned dataset in the set of versioned datasets may comprise at least one sub-entry representing a version of the each versioned dataset in the full data provenance of the selected versioned dataset. A sub-entry of the compound node for a particular versioned dataset in the set of versioned datasets may be visually distinguished in the graphical user interface from other sub-entries of compound nodes of the graph to indicate that a version of the particular versioned dataset represented by the sub-entry has been flagged in a database as containing invalid data. An edge in the graph representing a derivation dependency of a first version of a first versioned dataset in the set of versioned datasets on a second version of a second versioned dataset in the set of versioned datasets may be visually distinguished from other edges in the graph to indicate that the first version of the first versioned dataset potentially contains invalid data as a result of the derivation dependency. At least one version of a versioned dataset in the set of versioned datasets may contain data generated as a result of a Spark system executing a derivation program taking at least one version of another versioned dataset as input. At least one version of a versioned dataset in the set of versioned datasets may contain data generated as a result of a MapReduce system executing a derivation program taking at least one version of another versioned dataset as input.

In one aspect, the subject innovations are embodied in one or more non-transitory computer-readable media storing one or more programs. The one or more programs comprise instructions for receiving selection of a versioned dataset that is within a data pipeline system. The one or more programs further comprise instructions for determining full data provenance of the selected versioned dataset. The full data provenance comprises a set of versioned datasets. The one or more programs further comprise instructions for providing for display of a visualization of the full data provenance of the selected versioned dataset. The visualization comprises a graph. The graph comprises a compound node for the selected versioned dataset and for each versioned dataset in the set of versioned datasets. The graph further comprises edges connecting the compounds nodes. Each edge represents a derivation dependency between versions of the versioned datasets represented by the compound nodes connected by the edge.

In one aspect, the subject innovations are embodied in a system comprising memory, one or more processors, and one or more programs stored in the memory and configured for execution by the one or more processors. The one or more programs comprise instructions for receiving selection of a versioned dataset that is within a data pipeline system. The one or more programs further comprise instructions for determining full data provenance of the selected versioned dataset. The full data provenance comprises a set of versioned datasets. The one or more programs further comprise instructions for providing for display of a visualization of the full data provenance of the selected versioned dataset. The visualization comprises a graph. The graph comprises a compound node for the selected versioned dataset and for each versioned dataset in the set of versioned datasets. The graph further comprises edges connecting the compounds nodes. Each edge represents a derivation dependency between versions of the versioned datasets represented by the compound nodes connected by the edge.

It is understood that other configurations of the subject innovations will become readily apparent to those skilled in the art from the following detailed description, wherein various configurations of the subject innovations are shown and described by way of illustration. As will be realized, the subject innovations are capable of other and different configurations and its several details are capable of modification in various other respects, all without departing from the scope of the subject innovations. Accordingly, the drawings and detailed description are to be regarded as illustrative in nature and not as restrictive.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Figure 1:
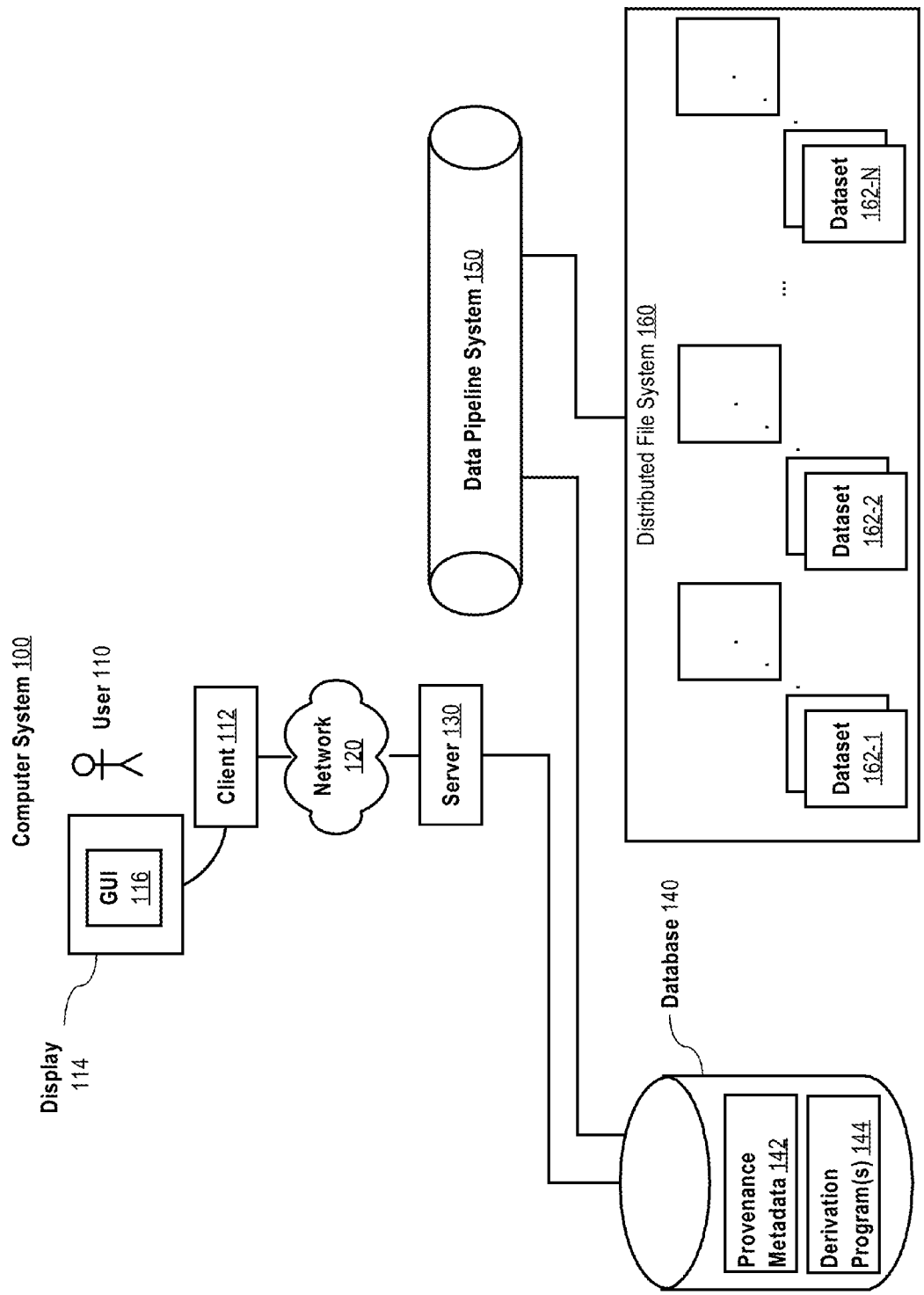
FIG. 1 illustrates an example of a computer system configured to provide full data provenance visualization of versioned datasets.

The detailed description set forth below is intended as a description of various configurations of the subject innovations and is not intended to represent the only configurations in which the subject innovations may be practiced. The appended drawings are incorporated herein and constitute a part of the detailed description. The detailed description includes specific details for the purpose of providing a thorough understanding of the subject innovations. However, the subject innovations are not limited to the specific details set forth herein and may be practiced without these specific details. In some instances, some structures and components are shown in block diagram form in order to avoid obscuring the concepts of the subject innovations.

Glossary

The following definitions are offered for purposes of illustration, not limitation, in order to assist with understanding the discussion that follows.

MapReduce: MapReduce is a programming model and an associated implementation for processing and generating large datasets with a parallel, distributed algorithm on a cluster. See, e.g., Dean, Jeffrey, et al., "MapReduce: Simplified Data Processing on Large Clusters", Google, Inc., 2004, the entire contents of which is hereby incorporated by reference as if fully set forth herein. APACHE HADOOP is a well-known open source implementation of MapReduce.

Spark: Like MapReduce, Spark is a programming model and an associated implementation for processing and generating large datasets with a parallel, distributed algorithm on a cluster. However, Spark is optimized for data-intensive applications that reuse a working set across multiple parallel operations including iterative jobs and interactive analytics. See, e.g., Zaharia, et al., "Resilient Distributed Datasets: A Fault-Tolerant Abstraction for In-Memory Cluster Computing", $9^{th}$ USENIX Symposium on Networked Systems Design and Implementation, 2012, the entire contents of which is hereby incorporated by reference as if fully set forth herein. APACHE SPARK is a well-known open source implementation of Spark.

General Overview

As noted above, it may be useful to a user of a data pipeline system to visualize the full data provenance of a versioned dataset. As used herein, the term "full data provenance" of a given versioned dataset encompasses at least all other versioned datasets from which the given versioned dataset is derived and may also include any further versioned datasets in the full data provenance of the other versioned datasets from which the given versioned dataset is derived. For example, if versioned dataset A is derived from versioned datasets B and C, versioned dataset C is derived from versioned dataset D, and versioned dataset D is derived from versioned dataset E, then the full data provenance of versioned dataset A encompasses at least versioned datasets B and C but may also include versioned dataset D and/or versioned dataset E.

As a practical matter, a version of a dataset in a typical data pipeline system may be derived from versions of one or more other datasets, and those datasets each derived from versions of one or more further datasets, and so forth creating a situation where the validity of the dataset version depends on the validity of tens, hundreds, or more other dataset versions. It may be difficult within existing data pipeline systems to discover the full data provenance of a given dataset version and determine whether the dataset version is based on an invalid dataset version. For example, user Alice may flag dataset version D1 as invalid and user Bob may want to know if dataset version X1 is based on dataset version D1. A data pipeline system vendor or other software vendor may wish to assist Bob in discovering the full data provenance of dataset version X1 and help Bob determine if dataset version X1 is based on an invalid dataset version D1. As the foregoing illustrates, an approach for providing a visualization of the full data provenance of a dataset version may be desirable.

The subject innovations relate to providing a visualization of the full data provenance of a dataset version that is within a data pipeline system. In one implementation, a server may receive selection of a dataset within the data pipeline system. For example, a user may direct user input to a graphical user interface at a client computing device that selects the dataset from among other possible selectable datasets, and the selection may be transmitted to the server. The server may determine the full data provenance of the selected dataset. The full data provenance of the selected dataset may include a set of zero or more other datasets. The set may include at least any other datasets from which a version of the selected dataset is derived from in addition to any datasets from which those datasets are derived from and so on. The server may provide for display of a visualization of the full data provenance of the version of the selected dataset. The visualization may be displayed in a graphical user interface at the client computing device. For example, the visualization may be displayed within a web browser window or within an application window.

The visualization may include a graph. The graph may include a compound node for the selected dataset and a compound node for each dataset in the set of datasets of the full data provenance of the selected dataset. For example, the compound node for a dataset may include a sub-entry for each version of the dataset involved in the full data provenance of the selected dataset. For example, version one of selected dataset E might be derived from version one of dataset C and version twenty-nine of dataset D. Version one of dataset C might be derived, at least in part, from version five of dataset B. And version twenty-nine of dataset D might be derived, at least in part, from version twelve of dataset B. In this case, the compound node for dataset B may have at least two sub-entries: one sub-entry representing version five of dataset B and another sub-entry representing version twelve of dataset B.

The graph further comprises edges connecting the compounds nodes. Each edge represents a derivation dependency between versions of the versioned datasets represented by the compound nodes connected by the edge. For example, an edge connecting a sub-entry of the compound node for dataset B and a sub-entry of the compound node for dataset D may represent a derivation dependency between version twenty-nine of dataset D and version twelve of dataset B.

The sub-entry of a compound node corresponding to a dataset version that has been flagged or marked invalid may be highlighted or visually distinguished in the visualization. For example, assume version twelve of dataset B fails a dataset validation process and as a result is flagged or marked invalid in a database. In this case, the sub-entry of the compound node representing version twelve of dataset B, the edge connecting that sub-entry to the sub-entry of the compound node representing version twenty nine of dataset D, the sub-entry of the compound node representing version twenty nine of dataset D, the edge connecting the sub-entry of the compound node representing version twenty nine of dataset D to version one of dataset E, and the compound node representing dataset E all may be colored red or visually distinguished in some way to indicate that version twelve of dataset B contains invalid data and that version twenty nine of dataset D and version one of dataset E may contain invalid data as a result of version twelve of dataset B containing invalid data.

Advantageously, in some implementations of the subject innovations, a user is informed of the full data provenance of a selected dataset version. As a result, the user may more easily identify derivation dependencies between dataset versions including derivation dependencies involving invalid dataset versions.

Example Computer System

FIG. 1 illustrates an example of a computer system 100 configured to provide full data provenance visualization of versioned datasets. As shown, the computer system 100 includes a client computing device 112 used by a human user 110, a server 130, a database 140, a data pipeline system 150, and a distributed file system 160. The client computing device 112 and the server 130 may be configured to communicate with one another via a network 120. The network 120 may include the Internet, an intranet, a local area network, a wide area network, a wired network, a wireless network, a virtual private network (VPN).

The client computing device 112 may be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which display 114 may be a part of). For example, the client computing device 112 may be composed of hardware components like those of basic computing device 500 described below with respect to FIG. 5 and configured with a basic software system like software system 600 described below with respect to FIG. 6. The client computing device 112 may also include a web browser or a client application configured to display, in a graphical user interface 116 of the client computing device 112 display 114, a visualization of the full provenance of a selected dataset version in accordance with this disclosure of the subject innovations. The graphical user interface 116 may be a web browser window, a client application window, an operating system window, or other computer graphical user interface window. While only one user 110 and one client computing device 112 are illustrated in FIG. 1, the subject innovations may be implemented in conjunction with one or more users 110 and one or more client computing devices 112.

The server 130 may include a full data provenance visualization module to provide a visualization of the full data provenance of a selected dataset version, based on provenance metadata 142 stored in database 140. The server 130 may be implemented as a single server computing device or as multiple server computing devices arranged in a distributed or clustered computing arrangement. Each such server computing device may be composed of hardware components like those of basic computing device 500 described below with respect to FIG. 5 and configured with a basic software system like software system 600 described below with respect to FIG. 6.

The server 130 may include one or more processors (e.g., CPUs), a network interface, and memory. The processor(s) may be configured to execute computer instructions that are stored in one or more computer-readable media, for example, the memory of the server 130. The server 130 may include a network interface that is configured to allow the server 130 to transmit and receive data in a network, e.g., network 120 of FIG. 1. The network interface may include one or more network interface cards (NICs). The memory of the server 130 may store data or instructions. The instructions stored in the memory may include the full data provenance visualization module.

The database 140 may include a database server module for storing and retrieving database data including provenance metadata 142 and derivation programs 144. The database 140 may be implemented as a single server computing device or as multiple server computing devices arranged in a distributed or clustered computing arrangement. Each such server computing device may be composed of hardware components like those of basic computing device 500 described below with respect to FIG. 5 and configured with a basic software system like software system 600 described below with respect to FIG. 6.

The database 140 may include one or more processors (e.g., CPUs), a network interface, and memory. The processor(s) may be configured to execute computer instructions that are stored in one or more computer-readable media, for example, the memory of the database 140. The database 140 may include a network interface that is configured to allow the database 140 to transmit and receive data in one or more networks, e.g., a network connecting the server 130 and the database 140 and a network connecting the data pipeline system 150 to the database 140, which may be the same or different network as the network that connects the server 130 and the database 140. The network interface may include one or more network interface cards (NICs). The memory of the database 140 may store data or instructions. The instructions stored in the memory may include the database server module.

The data pipeline system 150 may include a dataset derivation module to derive dataset 162 versions from other dataset 162 versions by executing derivation programs 144. The data pipeline system 150 may also include a provenance metadata update module for updating provenance metadata 142 in database 140 when new dataset 162 versions are derived. The data pipeline system 150 may be implemented as a single server computing device or as multiple server computing devices arranged in a distributed or clustered computing arrangement. Each such server computing device may be composed of hardware components like those of basic computing device 500 described below with respect to FIG. 5 and configured with a basic software system like software system 600 described below with respect to FIG. 6.

The data pipeline system 150 may include one or more processors (e.g., CPUs), a network interface, and memory.

The processor(s) may be configured to execute computer instructions that are stored in one or more computer-readable media, for example, the memory of the data pipeline system 150. The data pipeline system 150 may include a network interface that is configured to allow the data pipeline system 150 to transmit and receive data in a network, e.g., a network connecting the data pipeline system 150 and the database 140 and a network connecting the data pipeline system 150 to the distributed file system 160, which may be the same or different network as the network that connects the data pipeline system 150 and the database 140. The network interface may include one or more network interface cards (NICs). The memory of the database 140 may store data or instructions. The instructions stored in the memory may include the dataset derivation module and the provenance metadata update module. In an exemplary non-limiting embodiment, the dataset derivation module is implemented at least in part by an implementation of the MapReduce system, for example, APACHE HADOOP. In an exemplary non-limiting embodiment, the dataset derivation module is implemented at least in part by an implementation of the Spark system, for example, APACHE SPARK.

The distributed file system 160 may include a distributed file system module to provide distributed file system services to the data pipeline system 150 over a network that connects the distributed file system 160 and the data pipeline system 150. The distributed file system 160 may be implemented as a single server computing device or as multiple server computing devices arranged in a distributed or clustered computing arrangement. Each such server computing device may be composed of hardware components like those of basic computing device 500 described below with respect to FIG. 5 and configured with a basic software system like software system 600 described below with respect to FIG. 6.

The distributed file system 160 may include one or more processors (e.g., CPUs), a network interface, and memory. The processor(s) may be configured to execute computer instructions that are stored in one or more computer-readable media, for example, the memory of the distributed file system 160. The distributed file system 160 may include a network interface that is configured to allow the distributed file system 160 to transmit and receive data in a network, e.g., a network connecting distributed file system 160 and the data pipeline system 150. The network interface may include one or more network interface cards (NICs). The memory of the distributed file system 160 may store data or instructions. The instructions stored in the memory may include the distributed file system module. In an exemplary non-limiting embodiment, the distributed file system module is implemented by the APACHE HADOOP Distributed File System (HDFS) configured on a cluster of commodity server computing devices.

The full data provenance visualization module of the server 130 is configured to provide a visualization of the full data provenance of a selected versioned dataset 162, based on provenance metadata 142 stored in database 140. The selected version dataset 162 may be stored within the data pipeline system 150. The data pipeline system 150 includes the distributed file system 160. The visualization may include a graph. The graph may comprise compound nodes and edges connecting the compound nodes in the graph. Each of the compound nodes may represent the selected dataset 162 or a dataset 162 in the full data provenance of the selected dataset 162. Each edge represents a derivation dependency between a version of a dataset 162 and a version of another dataset 162.

A dataset 162 is a logical collection of highly structured, semi-structured, or unstructured data. A non-limiting example of highly structured data is data that conforms to a standardized or well-known data model, for example, a relational model or other table-based data model. A non-limiting example of semi-structured data is data that has self-describing structure, for example, eXtensible Markup Language (XML) data or Javascript Object Notation (JSON) data. A non-limiting example of unstructured data is data that is not highly structured or semi-structured data, for example, some text data or log data. Each dataset 162 version may be stored in one or more files in the distributed file system 160.

A derivation dependency may exist between two versions of two datasets 162 if one of the two versions was derived from the other of the two versions within the data pipeline system 150. In particular, a version of a "target" dataset 162 may be derived by the data pipeline system 150 from one or more versions of one or more "input" datasets 162. In doing so, the data pipeline system 150 may provide the version(s) of the input dataset(s) 162 as input to the derivation program 144. The derivation program 144, in conjunction with the data pipeline system 150, may produce the version of the target dataset 162 as output. In this case, the version of the target dataset 162 has a derivation dependency on each of the version(s) of the input dataset(s) 162. Such derivation dependencies may be stored by the data pipeline system 150 in database 140 as part of the provenance metadata 142.

Database 140 may store one or more derivation programs 144. A derivation program 144 may include instructions for extracting (e.g., selecting) and transforming data from version(s) of one or more datasets 162 input to derivation program 144. The extracted and transformed data may be stored as a new dataset 162 version in the distributed file system 160. The derivation program 144 itself may specify the versions of the dataset(s) 162 that are to be the input to the derivation program 144 when executed. Alternatively, a user may specify the versions of the dataset(s) 162 that are to be the input to an execution of the derivation program 144. The derivation program 144 may be executed by the dataset derivation module of the data pipeline system 150. The derivation program 144 may include a variety of different high-level query language instructions depending on whether the dataset derivation module is a MapReduce-based or Spark-based. For example, if the dataset derivation module is MapReduce-based, then the derivation program 144 may include, for example, MapReduce instructions that invoke an APACHE HADOOP MapReduce Application Programming Interface (API), APACHE PIG instructions, APACHE HIVE instructions, Jaql instructions, or other instructions for carrying out MapReduce operations on datasets 162. If the dataset derivation module is Spark-based, then the derivation program 144 may include, for example, Scala, Java, Python, Clojure, or R instructions for carrying out Spark transformations on datasets 162. While derivation programs 144 are shown in FIG. 1 as being stored in database 140, derivation programs 144 may be stored in another location, for example, in the distributed file system 160 or in a different database.

Provenance metadata 142 comprises information about the full data provenance of dataset 162 versions. For a given dataset 162 within the data pipeline system 150, provenance metadata 142 may include all of the following information about the given dataset 162, or a subset or a superset thereof:
A name or unique identifier of the given dataset 162.
An identifier of each version of the given dataset 162 within the data pipeline system 150.
An identifier of the current version of the given dataset 162 within the data pipeline system 150.

For each version of the given dataset 162 within the data pipeline system 150, the provenance metadata 142 may include all of the following information about the given dataset 162 version, or a subset or a superset thereof:
The identifier of the version of the given dataset 162 version.
If the given dataset 162 version was derived from one or more other dataset 162 versions, then, for each such other dataset 162, the name or unique identifier of the other dataset 162 and the identifier of the version of the other dataset 162.
If the given dataset 162 version was derived from one or more other dataset 162 versions, the name or identifier of the derivation program 144 executed by the data pipeline system 150 to derive the given dataset 162 version. In some implementations, derivation programs 144 are versioned and the provenance metadata 142 includes the identifier of the version of the derivation program 144 executed by the data pipeline system 150 to derive the given dataset 162 version.
A flag (e.g., a dirty bit) that indicates that the given dataset 162 version contains invalid data. The flag may be set as a result of the given dataset 162 version failing a data validation process, for example.

In one example, the full data provenance visualization module of the server 130 is implemented in software. The full data provenance visualization module may include code for receiving selection of a versioned dataset 162 within the data pipeline system 150. The data pipeline system 150 includes the distributed file system 160. The selection may be received by the full data provenance visualization module of the server 130 over network 120 from client computing device 112 (e.g., in a HTTP or HTTPS request) as a result of the user 110 interacting with a graphical user interface 116 presented on the display 114. The selection may be for just a dataset 162 or for a particular version of a dataset 162. If the selection is for just a dataset 162, then a particular version of the dataset 162 may be selected by the full data provenance visualization module based on the selection. For example, the full data provenance visualization module may select, as the particular version of the dataset 162 to provide a full data provenance visualization of, the current version of the selected dataset 162 or the most recent version of the selected dataset 162 as indicated in the provenance metadata 142.

The full data provenance visualization module may further include code for determining full data provenance of the particular version of the selected versioned dataset 162. The full data provenance may include a set of zero or more versioned datasets 162. The set may include no versioned datasets 162 if the particular version of the selected dataset 162 is not derived from any other datasets 162. For example, the particular version of the selected dataset 162 may have been stored in the distributed file system 160 by an external data source and not generated by the data pipeline 150 as a result of executing a derivation program 144. As another example, the particular version of the selected dataset 162 may have been generated by the data pipeline 150 as a result of executing a derivation program 144 that did not accept any other dataset 162 versions as input.

To determine the full data provenance of the particular version of the selected dataset 162, the full data provenance visualization module may consult the provenance metadata 162 in the database 140. In particular, the full data provenance visualization module may start the determination with an empty set of dataset 162 versions representing the full data provenance of the particular version of the selected dataset 162. The determination may then include the full data provenance visualization module consulting the provenance metadata 162 to determine all dataset 162 versions from which the particular version of the selected dataset 162 was derived and adding those dataset 162 versions to the set of versioned datasets 162 representing the full data provenance of the particular version of the selected dataset 162. The full data provenance visualization module may then repeat this determination for each of those dataset 162 versions just added to the set and so on in a recursive or iterative manner, adding any dataset 162 versions from which a dataset 162 version in the full data provenance of the particular version of the selected dataset 162 was derived to the set of dataset 162 versions representing the full data provenance of the particular version of the selected dataset 162. The recursion or iteration may end when all dataset 162 versions, according to the provenance metadata 142, in the full data provenance of the particular version of the selected dataset 162 have been determined and added to the set, or when a stop condition is reached. The stop condition may be based on a threshold degree of derivation between the particular version of the selected dataset 162 and a dataset 162 version in the full data provenance of the particular version of the selected dataset 162. For example, if the threshold degree of derivation is ten, then only dataset 162 versions in the full data provenance of the particular version of the selected dataset 162 that are within ten degrees derivation of the particular version of the selected dataset 162 will be added to the set of versioned datasets 162 representing the full data provenance of the particular version of the selected dataset 162.

The full data provenance visualization module may further include code for providing for display (e.g., via a web browser on the client computing device 112) of a visualization of the determined full data provenance of the particular version of the selected dataset 162. The visualization may include a graph. The graph may include a compound node for the selected dataset 162 and for each dataset 162 in the set of dataset 162 versions representing the full data provenance of the particular version of the selected dataset 162. The graph may include directed edges connected the compound nodes. Each directed edge may represent a derivation dependency between versions of the versioned datasets 162 represented by the compound nodes connected by the edge. Each compound node may include a sub-entry for each version of the dataset 162 represented by the compound node in the set of dataset 162 versions representing the full data provenance of the particular version of the selected dataset 162.

Example Graphical User Interfaces

Figure 2:
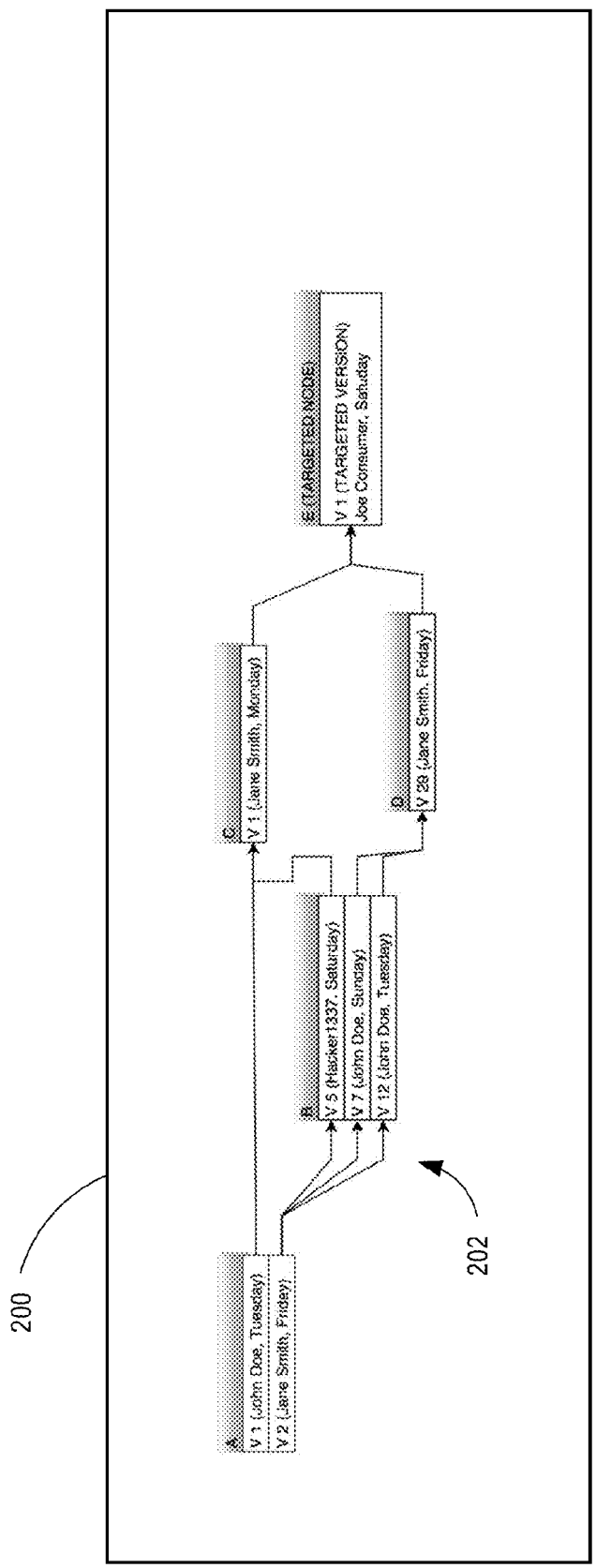
FIG. 2 illustrates an example graphical user interface configured to provide full data provenance visualization of versioned datasets.

FIG. 2 illustrates an example graphical user interface window 200 (e.g., a web browser window) configured to provide full data provenance visualization of versioned datasets.

The window 200 may be displayed via the display 114 (e.g., a screen) of the client computing device 112. As shown, the window 200 includes a graph 202.

The graph 202 represents the determined full data provenance of version one of selected dataset E. As indicated by the graph 202, version one of selected dataset E has a derivation dependency on version one of dataset C and version twenty nine of dataset D. Version one of dataset C has a derivation dependency on version one of dataset A and version five of dataset B. Version twenty nine of dataset D has a derivation dependency on versions seven and twelve of dataset B. Versions five, seven, and twelve of dataset B each have a derivation dependency on version two of dataset A. Since there are three versions of dataset B in the full data provenance of version one of dataset E, there are three sub-entries of the compound node representing dataset B in the graph 202. The three sub-entries represent the three versions, respectively. The remaining compound nodes have only one sub-entry as only one version of each of the remaining datasets is in the full data provenance of version one of selected dataset E.

A compound node in a graph representing a dataset may indicate the name or identifier of the dataset. For example, the compound node representing dataset B in graph 202 is labeled with the text "B".

The compound node in a graph representing the selected dataset may indicate the selected dataset. For example, the compound node representing selected dataset E in graph 202 is labeled with the text "(TARGETED NODE)" to indicate that dataset E is the selected dataset for which the full data provenance is visualized in GUI 200. The compound node representing the selected dataset may be colored differently (or otherwise visually distinguished) from the other compound nodes in the graph to indicate the selected dataset.

A sub-entry of a compound node representing a version of a dataset may include metadata about the version of the dataset. For example, the sub-entry of the compound node representing version one of dataset C in graph 202 indicates that version number (e.g., "V 1"), the name of a user of a data pipeline system that caused the data pipeline system to create version one of dataset C (e.g., "Jane Smith"), and the date version of dataset C was created (e.g., "Monday").

Figure 3:
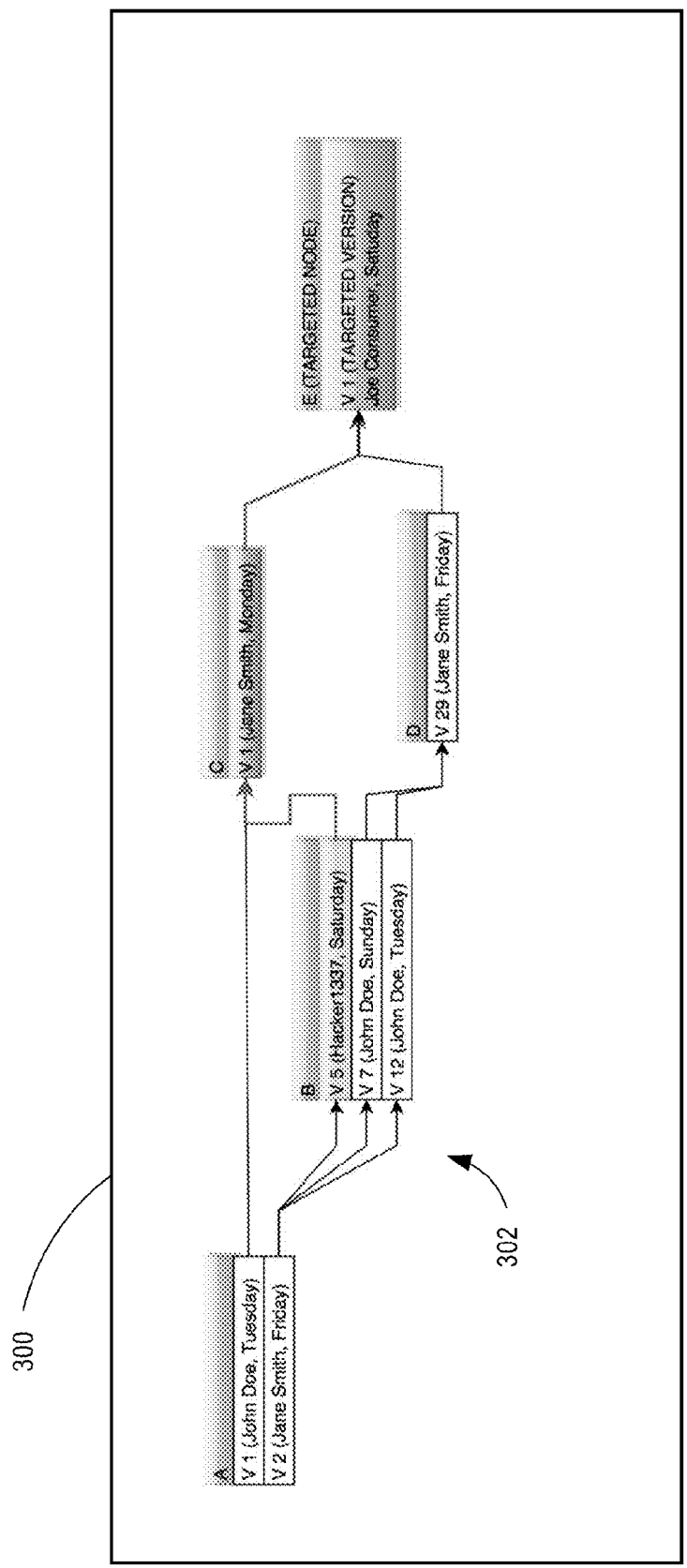
FIG. 3 illustrates an example graphical user interface configured to provide full data provenance visualization of versioned datasets.

FIG. 3 illustrates an example graphical user interface window 300 (e.g., a web browser window) configured to provide full data provenance visualization of versioned datasets.

The window 200 may be displayed via the display 114 (e.g., a screen) of the client computing device 112. As shown, the window 300 includes a graph 302.

The graph 302 represents the determined full data provenance of version one of selected dataset E. As indicated by the graph 302, version one of selected dataset E has a derivation dependency on version one of dataset C and version twenty nine of dataset D. Version one of dataset C has a derivation dependency on version one of dataset A and version five of dataset B. Version twenty nine of dataset D has a derivation dependency on versions seven and twelve of dataset B. Versions five, seven, and twelve of dataset B each have a derivation dependency on version two of dataset A. Since there are three versions of dataset B in the full data provenance of version one of dataset E, there are three sub-entries of the compound node representing dataset B in the graph 302. The three sub-entries represent the three versions, respectively. The remaining compound nodes have only one sub-entry as only one version of each of the remaining datasets is in the full data provenance of version one of selected dataset E.

In this example, version five of dataset B has been flagged as invalid. For example, version five of dataset B may have failed a data validation process. As a result, the sub-entry representing version five of dataset B is colored differently (or otherwise visually distinguished) from other sub-entries in the graph 302 to indicate that the dataset version contains invalid data.

Other sub-entries representing "downstream" dataset versions may also be colored differently (or otherwise visually distinguished) to indicate that they may also contain invalid data as a result of invalid data in a dataset version. For example, since version one of dataset C has a derivation dependency on invalid version five of dataset B and version one of dataset E has a derivation dependency on potentially invalid version one of dataset C, the sub-entries representing version one of dataset C and version one of dataset E may be colored differently (or otherwise visually distinguished) to indicate that they may potentially contain invalid data as a result of the invalid data in version five of dataset B.

An edge connecting a sub-entry representing a potentially invalid dataset version to a sub-entry representing an invalid dataset version may be colored differently (or otherwise visually distinguished) from other edges in a graph to indicate that the potentially invalid dataset version has a derivation dependency on an invalid dataset version. For example, the edge in graph 302 connecting the sub-entry representing version one of dataset C with the sub-entry representing version five of dataset B may be colored differently (or otherwise visually distinguished) from other edges in the graph 302 to indicate that the potentially invalid version one of dataset C has a derivation dependency on an invalid version five of dataset B.

An edge connecting a sub-entry representing a potentially invalid dataset version to a sub-entry representing another potentially invalid dataset version may be colored differently (or otherwise visually distinguished) from other edges in a graph to indicate that the potentially invalid dataset version has a derivation dependency on another potentially invalid dataset version. For example, the edge in graph 302 between the sub-entry representing version one of dataset E and the sub-entry representing version one of dataset C may be colored differently (or otherwise visually distinguished) from other edges in the graph 302 to indicate that the potentially invalid version one of dataset E has a derivation dependency on potentially invalid version one of dataset C.

While in some embodiments as exemplified in FIG. 3, an edge in a graph representing a derivation dependency between dataset versions is directed from a sub-entry of a compound node representing an input dataset version to a derivation program to a sub-entry of a compound representing the output dataset version from the derivation program, the edge is directed from the sub-entry representing the output dataset version to the sub-entry representing the input dataset version in other embodiments.

Example Process

Figure 4:
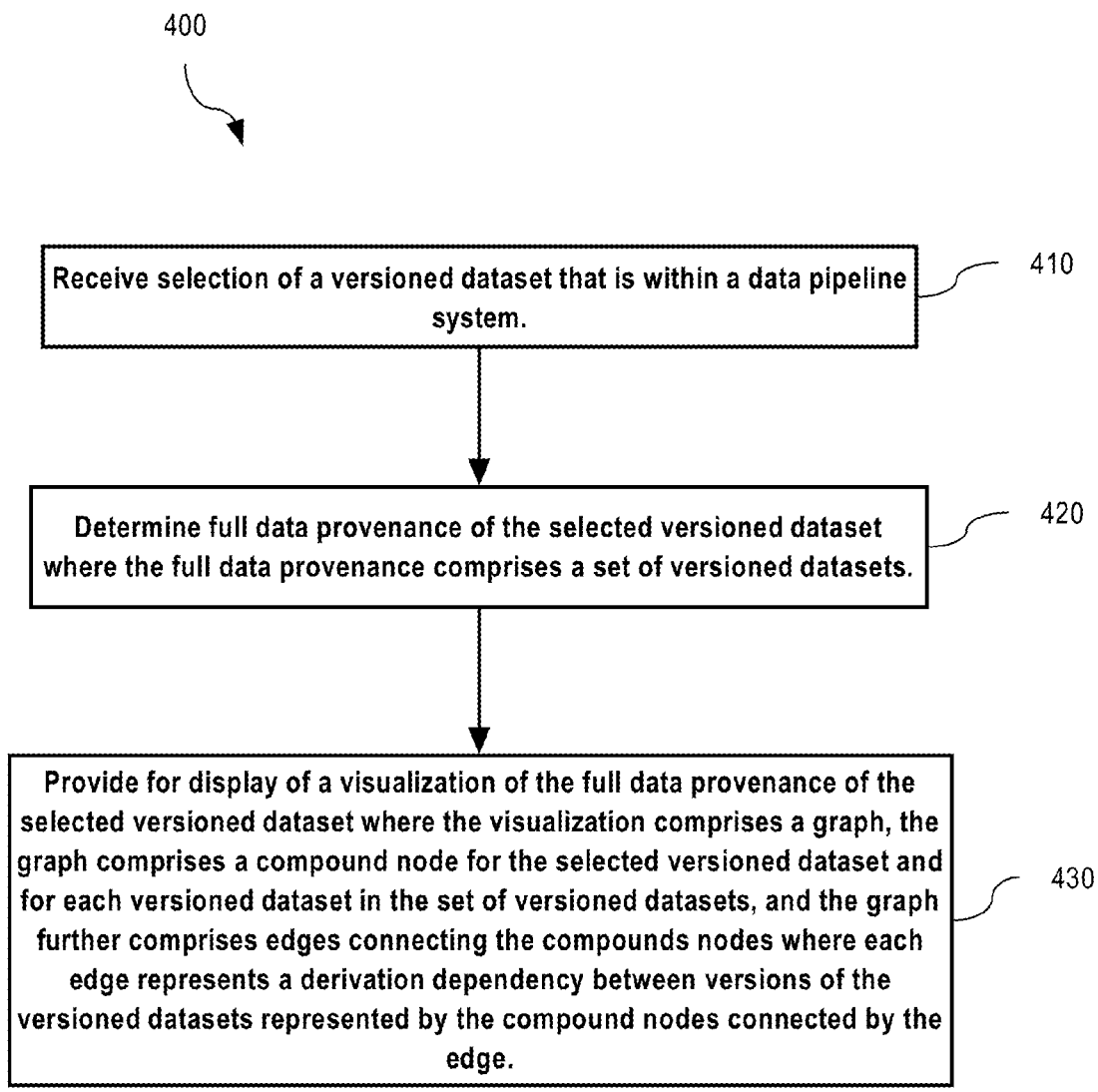
FIG. 4 illustrates an example process by which full data provenance visualization for versioned datasets is provided.

FIG. 4 illustrates an example process 400 by which full data provenance visualization for versioned datasets is provided. Process 400 may be performed by software when executed by one or more computing devices. For example, process 400 may be performed by one or more applications 602 executing on one or more computing devices 500, each configured with a software system like software system 600. (See FIGS. 5 and 6 and associated description below). The one or more computing devices on which process 400 executes can be, for example, client 112, server 130, or a combination of client 112 and server 130.

The process 400 beings at step 410, where a server (e.g., server 130) receives selection of a versioned dataset (e.g., 162-1). That versioned dataset may be within a data pipeline system (e.g., data pipeline system 150 and distributed file system 160). In fact, a number of versioned datasets may be within the data pipeline system. Some, but not necessarily all, of the dataset versions within the data pipeline system may be "derived" datasets in that the dataset version is generated by the data pipeline system executing a derivation program (e.g., 144), or a version of a derivation program. When executed, the derivation program may accept one or more other dataset versions as input. In this way, the generated dataset version is derived from the input dataset version(s). In some instances, a dataset version within the data pipeline system is generated as a result of a Spark system executing a derivation program taking a version of at least one other dataset as input to the derivation program. In some instances, a dataset version within the data pipeline system is generated as a result of a MapReduce system executing a derivation program taking a version of at least one other dataset as input to the derivation program.

The server may receive selection of the versioned dataset over a network (e.g., 120). The server may receive the selection from a client computing device (e.g., 112). The received selection may identify the versioned dataset selected. In addition, the received selection may identify a particular version of the selected dataset for which to determine the full data provenance of. If the selection does not identify a particular version of the selected dataset, then the server may assume a default version of the selected dataset. The default version can be selected by the server based on provenance metadata (e.g. 142) for the selected dataset. In some instances, the server selects a current version of the selected dataset as the default version. In some instances, the server selects the latest (more recent) version of the selected dataset as the default version.

In step 420, the server determines the full data provenance of the particular version of the selected dataset. The full data provenance may comprise a set of zero or more other datasets within the data pipeline system. For example, GUI 300 of FIG. 3 shows that datasets A, B, C, and D are in the full data provenance of version one of dataset E. In particular, version twenty nine of dataset D, version one of dataset C, versions five, seven, and twelve of dataset B, and versions one and two dataset A are in the full data provenance of version one of dataset E. The determination of the full data provenance of the particular version of the selected dataset may be based on the provenance metadata for datasets as maintained by the data pipeline system.

In step 430, the server provides for display (e.g., via a web browser window on the client computing device) of a visualization of the full data provenance of the particular version of the selected dataset. The visualization comprises a graph (e.g., 202 and 302). The graph may comprise a compound node for the selected dataset and a compound node for each versioned dataset in the set of versioned datasets determined in step 420. The graph may further comprise edges connecting the compounds nodes where each edge represents a derivation dependency between versions of the versioned datasets represented by the compound nodes connected by the edge.

In some instances, if a particular version of a particular dataset in the full data provenance of the particular version of the selected dataset is flagged or marked as invalid in the provenance metadata, then the sub-entry of the compound node representing the particular version of the particular dataset may be colored differently or otherwise visually distinguished in the graph from other sub-entries to indicate that the particular version of the particular dataset contains invalid data.

In some instances, if a particular version of a first dataset in the full data provenance of the particular version of the selected dataset has a derivation dependency on a particular version of a second dataset in the full data provenance of the particular version of the selected dataset and the particular version of the second dataset is flagged or marked as invalid in the provenance metadata, then the edge in the graph connecting the sub-entry of the compound node for the particular version of the first dataset to the sub-entry of the compound node for the particular version of the second dataset may be colored differently or otherwise visually distinguished in the graph from other edges to indicate that the particular version of the first dataset potentially contains invalid data as a result of the derivation dependency on the particular version of the second dataset.

In some instances, if a particular version of a first dataset in the full data provenance of the particular version of the selected dataset has a derivation dependency on a particular version of a second dataset in the full data provenance of the particular version of the selected dataset and the particular version of the second dataset potentially contains invalid data as a result of a derivation dependency on a version of a dataset that contains or potentially contains invalid data, then the edge in the graph connecting the sub-entry of the compound node for the particular version of the first dataset to the sub-entry of the compound node for the particular version of the second dataset may be colored differently or otherwise visually distinguished in the graph from other edges to indicate that the particular version of the first dataset potentially contains invalid data as a result of the derivation dependency on the particular version of the second dataset.

Basic Computing Device

Figure 5:
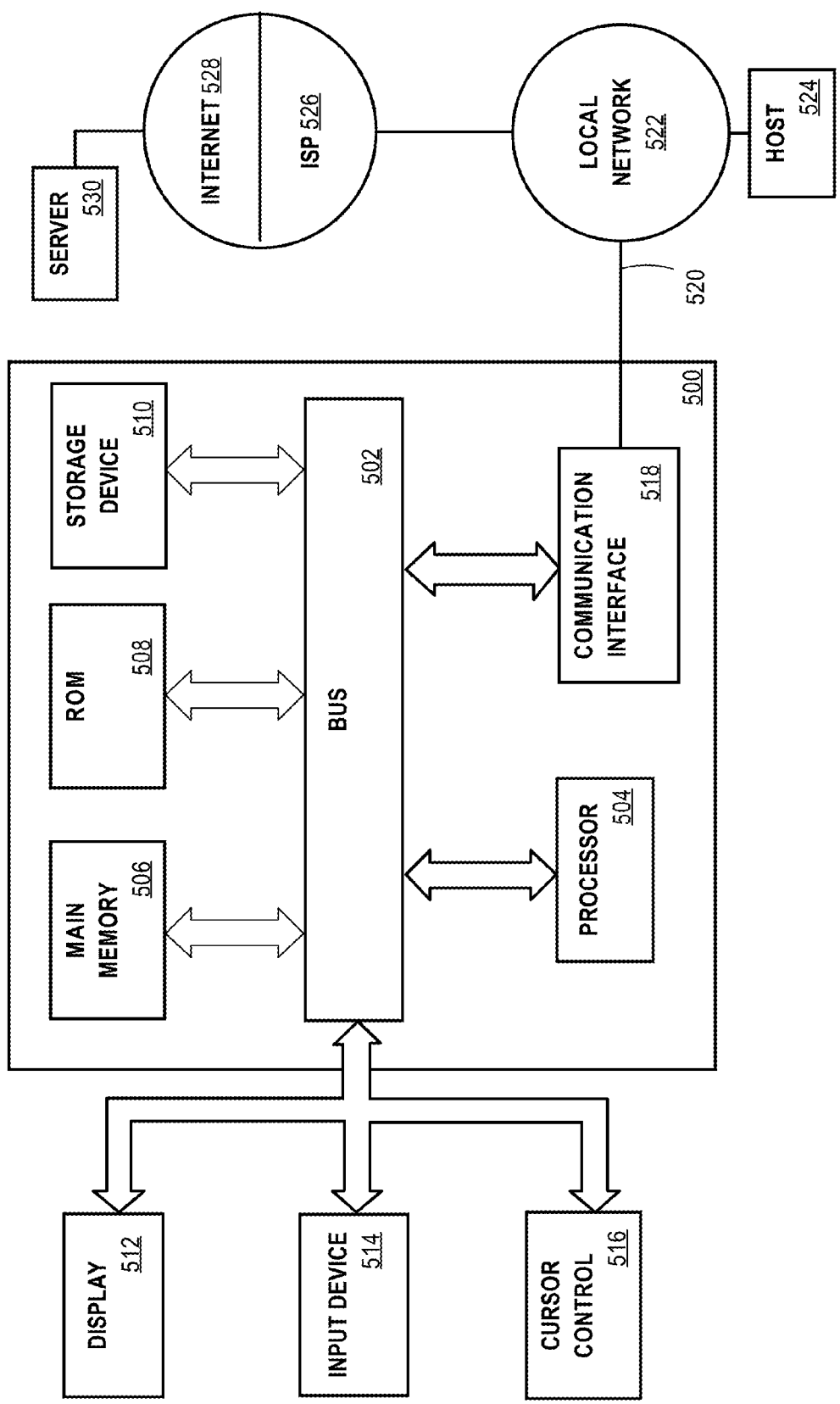
FIG. 5 is a very general block diagram of a computing device in which software-implemented processes of the subject innovations may be embodied.

Referring now to FIG. 5, it is a block diagram that illustrates a basic computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

Basic Software System

Figure 6:
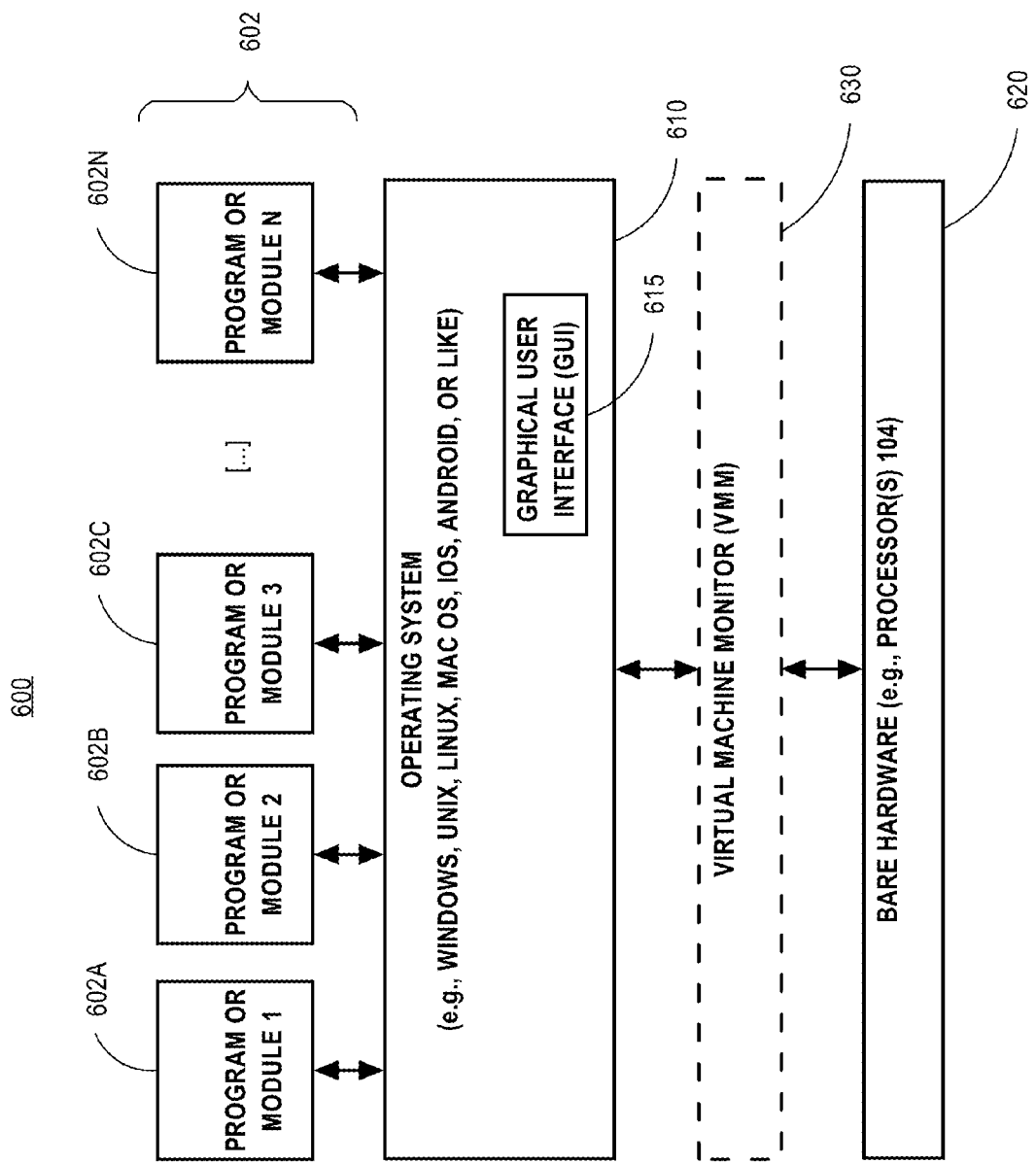
FIG. 6 is a block diagram of a basic software system for controlling the operation of the computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the subject innovations. Other software systems suitable for implementing the subject innovations may have different components, including components with different connections, relationships, and functions.

In various embodiments, software system 600 is provided for directing the operation of computing device 500. Software system 600, which may be stored in system memory (RAM) 506 and on fixed storage (e.g., hard disk or flash memory) 510, includes a kernel or operating system (OS) 610. The OS 610 manages low-level aspects of computer operation, including managing execution of processes, memory allocation, file input and output (I/O), and device I/O. One or more application programs, represented as 602A, 602B, 602C . . . 602N in FIG. 6, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server).

Software system 600 may include a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, comprising:
at one or more computing devices having one or more processors and memory storing one or more programs executed by the one or more processors to perform the method, performing the operations of:
storing an input dataset and provenance metadata identifying one or more previous versions of the input dataset;
using a derivation program, transforming data in the input dataset and storing the transformed data as a versioned dataset;
updating the provenance metadata to identify the input dataset in addition to the one or more previous versions of the input dataset;
receiving selection of the versioned dataset that is within a data pipeline system;
determining full data provenance of the selected versioned dataset, the full data provenance comprising a set of versioned datasets, by identifying, in the provenance metadata, at least the input dataset and the one or more previous versions of the input dataset;
providing for display of a visualization of the full data provenance of the selected versioned dataset, the visualization comprising a graph, the graph comprising a compound node for the selected versioned dataset and a compound node for each versioned dataset in the set of versioned datasets, the graph further comprising edges connecting the compounds nodes, each edge representing a derivation dependency between versions of the versioned datasets represented by the compound nodes connected by the edge;
wherein a sub-entry of the compound node for a particular versioned dataset in the set of versioned datasets is visually distinguished in the graphical user interface from other compound node sub-entries of the graph to indicate that a version, of the particular version dataset represented by the sub-entry has been flagged in a database as containing invalid data;
wherein an edge in the graph representing a derivation dependency of a first version of a first versioned dataset in the set of versioned datasets on a second version of a second versioned dataset in the set of versioned datasets is visually distinguished from other edges in the graph to indicate that the first version of the first versioned dataset potentially contains invalid data as a result of the derivation dependency.

2. The method of claim 1, wherein the compound node of the selected versioned dataset indicates a name or identifier of the selected version dataset; and wherein the compound node for each versioned dataset in the set of versioned datasets indicates a name or identifier of the each versioned dataset.

3. The method of claim 1, wherein the compound node for each versioned dataset in the set of versioned datasets comprises at least one sub-entry representing a version of the each versioned dataset in the full data provenance of the selected versioned dataset.

4. The method of claim 1, wherein at least one version of a versioned dataset in the set of versioned datasets contains data generated as a result of one or more Spark systems executing a derivation program taking at least one version of another versioned dataset as input to the derivation program.

5. The method of claim 1, wherein at least one version of a versioned dataset in the set of versioned datasets contains data generated as a result of one or more MapReduce systems executing a derivation program taking at least one version of another versioned dataset as input as input to the derivation program.

6. One or more non-transitory computer-readable media storing one or more programs, the one or more programs comprising instructions for:

storing an input dataset and provenance metadata identifying one or more previous versions of the input dataset;

using a derivation program, transforming data in the input dataset and storing the transformed data as a versioned dataset;

updating the provenance metadata to identify the input dataset in addition to the one or more previous versions of the input dataset;

receiving selection of a versioned dataset that is within a data pipeline system;

determining full data provenance of the selected versioned dataset, the full data provenance comprising a set of versioned datasets, by identifying, in the provenance metadata, at least the input dataset and the one or more previous versions of the input dataset;

providing for display of a visualization of the full data provenance of the selected versioned dataset, the visualization comprising a graph, the graph comprising a compound node for the selected versioned dataset and for each versioned dataset in the set of versioned datasets, the graph further comprising edges connecting the compounds nodes, each edge representing a derivation dependency between versions of the versioned datasets represented by the compound nodes connected by the edge;

wherein a sub-entry of the compound node for a particular versioned dataset in the set of versioned datasets is visually distinguished in the graphical user interface from other compound node sub-entries of the graph to indicate that a version, of the particular version dataset represented by the sub-entry has been flagged in a database as containing invalid data;

wherein an edge in the graph representing a derivation dependency of a first version of a first versioned dataset in the set of versioned datasets on a second version of a second versioned dataset in the set of versioned datasets is visually distinguished from other edges in the graph to indicate that the first version of the first versioned dataset potentially contains invalid data as a result of the derivation dependency.

7. The one or more non-transitory computer-readable media of claim 6, wherein the compound node of the selected versioned dataset indicates a name or identifier of the selected version dataset; and wherein the compound node for each versioned dataset in the set of versioned datasets indicates a name or identifier of the each versioned dataset.

8. The one or more non-transitory computer-readable media of claim 6, wherein the compound node for each versioned dataset in the set of versioned datasets comprises at least one sub-entry representing a version of the each versioned dataset in the full data provenance of the selected versioned dataset.

9. The one or more non-transitory computer-readable media of claim 6, wherein at least one version of a versioned dataset in the set of versioned datasets contains data generated as a result of one or more Spark systems executing a derivation program taking at least one version of another versioned dataset as input to the derivation program.

10. The one or more non-transitory computer-readable media of claim 6, wherein at least one version of a versioned dataset in the set of versioned datasets contains data generated as a result of one or more MapReduce systems executing a derivation program taking at least one version of another versioned dataset as input as input to the derivation program.

11. A system comprising:
memory;
one or more processors;
one or more programs stored in the memory and configured for execution by the one or more processors, the one or more programs comprising instructions for:

storing an input dataset and provenance metadata identifying one or more previous versions of the input dataset;

using a derivation program, transforming data in the input dataset and storing the transformed data as a versioned dataset;

updating the provenance metadata to identify the input dataset in addition to the one or more previous versions of the input dataset;

receiving selection of a versioned dataset that is within a data pipeline system;

determining full data provenance of the selected versioned dataset, the full data provenance comprising a set of versioned datasets, by identifying, in the provenance metadata, at least the input dataset and the one or more previous versions of the input dataset;

providing for display of a visualization of the full data provenance of the selected versioned dataset, the visualization comprising a graph, the graph comprising a compound node for the selected versioned dataset and for each versioned dataset in the set of versioned datasets, the graph further comprising edges connecting the compounds nodes, each edge representing a derivation dependency between versions of the versioned datasets represented by the compound nodes connected by the edge;

wherein a sub-entry of the compound node for a particular versioned dataset in the set of versioned datasets is visually distinguished in the graphical user interface from other compound node sub-entries of the graph to indicate that a version, of the particular version dataset represented by the sub-entry has been flagged in a database as containing invalid data;

wherein an edge in the graph representing a derivation dependency of a first version of a first versioned dataset in the set of versioned datasets on a second version of a second versioned dataset in the set of versioned datasets is visually distinguished from other edges in the graph to indicate that the first version of the first versioned dataset potentially contains invalid data as a result of the derivation dependency.

12. The system of claim 11, wherein the compound node of the selected versioned dataset indicates a name or identifier of the selected version dataset; and wherein the compound node for each versioned dataset in the set of versioned datasets indicates a name or identifier of the each versioned dataset.

13. The system of claim 11, wherein the compound node for each versioned dataset in the set of versioned datasets comprises at least one sub-entry representing a version of the each versioned dataset in the full data provenance of the selected versioned dataset.

* * * * *